United States Patent [19]

Tyrrell et al.

[11] Patent Number: 5,014,268
[45] Date of Patent: May 7, 1991

[54] PARALLEL TIME SLOT INTERCHANGER MATRIX AND SWITCH BLOCK MODULE FOR USE THEREWITH

[75] Inventors: Raymond E. Tyrrell, Wake Forest; Milton R. Briscoe; Joseph E. Sutherland, both of Raleigh, all of N.C.; Raymond E. Tyrrell, Wake Forest, all of N.C.

[73] Assignee: Alcatel NA, Inc., Hickory, N.C.

[21] Appl. No.: 295,887

[22] Filed: Jan. 11, 1989

[51] Int. Cl.[5] .............................................. H04Q 11/04
[52] U.S. Cl. ......................................... 370/68; 370/67
[58] Field of Search ........................ 370/58, 66, 67, 68, 370/68.1, 85.1, 85.9, 112, 58.1, 58.2, 58.3

[56] References Cited

U.S. PATENT DOCUMENTS

| | | |
|---|---|---|
| 3,701,112 | 10/1972 | Hagelbarger . |
| 4,470,139 | 9/1984 | Munter . |
| 4,564,936 | 1/1986 | Takahashi ............................ 370/68 |
| 4,736,406 | 4/1988 | Hasegawa et al. ................... 370/67 |
| 4,805,172 | 2/1989 | Barbe et al. ........................ 370/68.1 |
| 4,809,260 | 2/1989 | Davidson et al. .................. 370/68.1 |

FOREIGN PATENT DOCUMENTS 0042666 12/1981 United Kingdom .

Primary Examiner—Douglas W. Olms
Assistant Examiner—Wellington Chin
Attorney, Agent, or Firm—Peter C. Van Der Sluys

[57] ABSTRACT

A parallel time slot interchanger, particularly for use in telecommunication switching, comprises a plurality of switch groups, with each switch group containing a second plurality of channels. The parallel time slot interchanger incorporated a matrix-type architecture, with each module of the matrix comprising a switch block which in turn incorporates a switch memory, connect memory and associated control circuitry. The connect memory of each switch block is controlled by the control circuitry of that block. The data stored in the connect memory contains switch memory address information for reading channel data stored within the switch memory of the same switch block so as to be able to perform a time slot switching function during any given time slot of the parallel time slot interchanger. Each switch block is uniquely identified within its corresponding switch group so that only one switch memory address location is read and output during any time slot for each switch group.

54 Claims, 11 Drawing Sheets

PARALLEL TSI WITH DISTRIBUTED CONNECT MEMORY

PARALLEL TSI (PRIOR ART)

PARALLEL TSI WITH DISTRIBUTED CONNECT MEMORY

SWITCHBLOCK

PARALLEL TSI 3 X 3 MATRIX

PARALLEL TSI MATRIX STRUCTURE

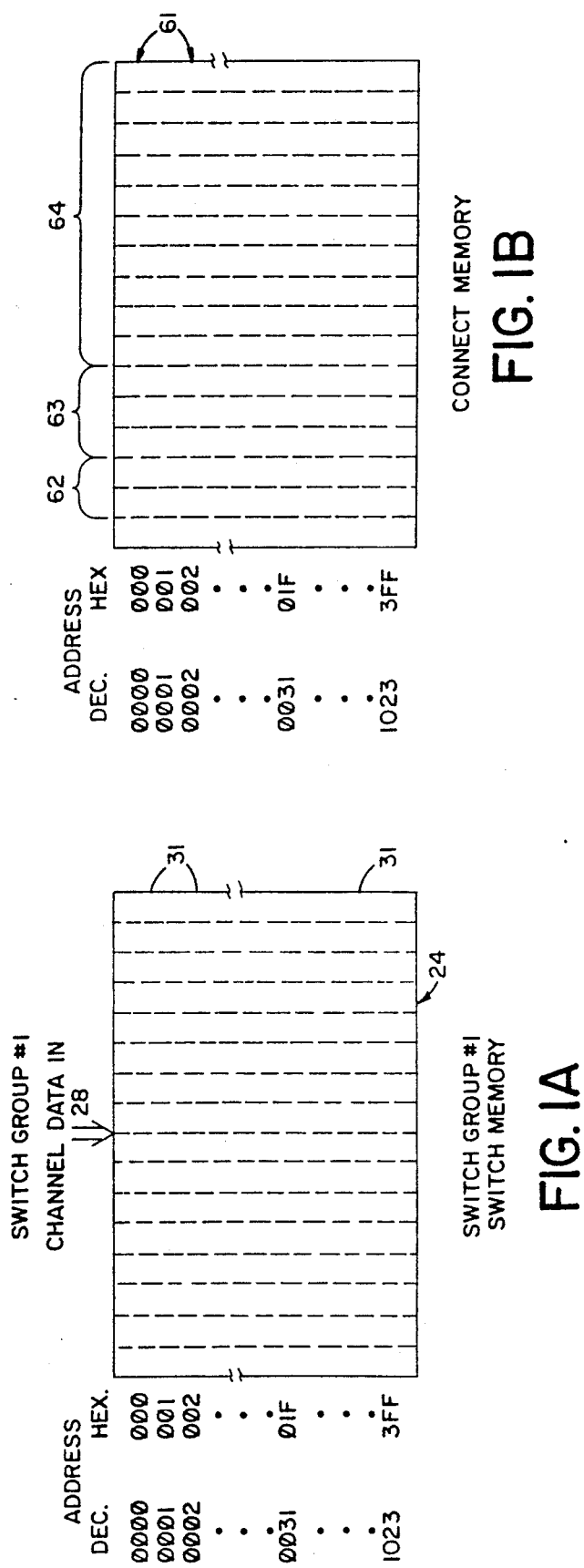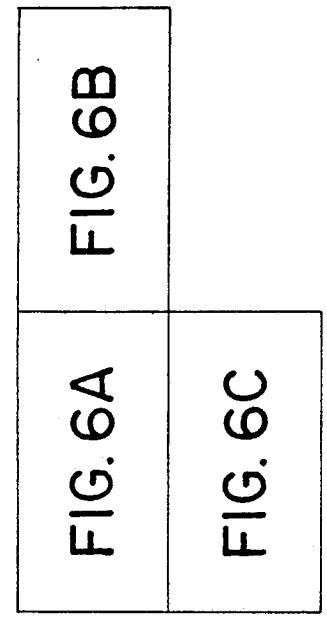

TIMING DIAGRAM

PARALLEL TIME SLOT INTERCHANGER MATRIX AND SWITCH BLOCK MODULE FOR USE THEREWITH

TECHNICAL FIELD

The present invention is directed to a new parallel time slot interchanger as used in telephony and specifically, such a time slot interchanger used in conjunction with digital encoding, such as pulse code modulation (PCM), of subscriber channels for the transmission and switching of such channels.

BACKGROUND OF THE INVENTION

Since the advent of telephony, there has been the need for switching and transmitting information from one telephone subscriber to another where each subscriber's information is carried over a subscriber channel. Such switching was originally accomplished through manual cable connections wherein an incoming channel from a first telephone subscriber would be manually switched at a central location (central office) by connecting that subscriber channel to a desired outgoing channel corresponding to a desired second subscriber. Manual interconnections were later automated through use of a matrix of mechanical switches commonly referred to as space switching.

Initially, transmission between switching points was accomplished over transmission lines wherein each set of lines served one subscriber at a given instant of time. With the discovery of frequency division multiplexing (FDM) the transmission of multiple subscriber's signals over a single telephone line pair was accomplished between switching points. With frequency division multiplexing, each subscriber's signal is presented on the line in a different frequency bandwidth which therefore provides for simultaneous transmission of multiple subscriber signals on a transmission line pair simultaneously.

Mechanical switches presented problems due to their relatively large size and the maintenance associated with mechanical devices of that nature. Similarly with frequency division multiplexing, signals had to be modulated in order to present them on different frequency bandwidths prior to leaving a switch point and then had to be demodulated for switching upon arrival at the next switch point prior. Such modulation - demodulation procedures created there own electronic problems such as signal distortion.

Subsequent to the introduction of frequency division multiplexing, pulse code modulation (PCM) was developed for use in telephony. In pulse code modulation, the magnitude of the signal representative of the telephonic information is sampled and each sample is approximated to a nearest reference level. Such a procedure is generally referred to as quantizing. Following this operation, a code is transmitted in digital form to a distant location wherein the code is representative of the telephonic signal's magnitude at a given instant of time. The use of pulse code modulation effectively merged the functions of both switching and transmission. Signals were encoded at the source, passed through one or more switch points and then decoded at their destination. The circuitry associated with PCM was less complicated that associated with FDM and furthermore, PCM allowed the replacement of mechanical switches with digital electronic switches. The use of PCM coding and digital switches gave rise to space and time switching. More particularly, space switching was accomplished through an electronic matrix of switches while time switching took advantage of the PCM inherent time division multiplexing by using an electronic time slot interchanger.

Current time slot interchangers are generally used in digital central office switches and digital crossconnects. The function of the time slot interchangers (TSI) allows crossconnection of subscribers while each subscriber's signal is maintained in its digital PCM form. More particularly, switching from one subscriber to another is accomplished by storing an incoming PCM signal from one subscriber's channel and having that signal subsequently sampled by a second subscriber's channel. Such switching from one subscriber to another is therefore effectively done through time switching and necessarily requires the use of memory for the storage of the PCM data of the first subscriber for reading by the intended second subscriber.

In the past, TSI's have been limited primarily due to limitation of memory technology. These limitations have generally been with regard to the speed of operation (that is the length of time necessary to write data into memory and to read data from memory), power requirements for the memory, physical size of the integrated circuit technology, and the number of external electrical interconnections necessary to the memory device(s).

Due to these limitations, large TSI functions were typically accomplished through use of a plurality of printed circuit board assemblies, each operating as a serial stage. Such multiple state configurations create complex switch control algorithms for utilization of all possible connection paths so as to minimize the possibility of call blocking; that is, failure to interconnect one subscriber to a desired second subscriber. The complexity of such switch algorithms have led to problems caused by limitations of th computer processors used therewith.

In some prior art implementations of TSI's, multiple board assembly stages could not be used for reasons of cost, physical size, delay requirements, interconnect sizing problems, or power constraints, all of which force features of such TSI's to be sacrificed. In some configurations, call blocking was allowed on a finite statistical basis which consequently limited the ability to interconnect any channel to any other channel under all circumstances. Furthermore, functions such as broadcast interconnects used for sharing common equipment such as tone, alarm code, or pseudorandom code generators and the like, have in some circumstances been sacrificed in prior art TSI configurations. In addition, maintenance functions such as loopback, bridging and terminating have been sacrificed. Furthermore, due to the unpredictability of the number of serial stages necessar to accomplish a given switch function, equal propagation delay switching of groups of channels is not achievable with these prior art TSI's.

The present invention is a time slot interchanger which can implement these functions without the use of multiple serial stages. The TSI according to the present invention performs such functions through use of a parallel matrix-type architecture, using high speed memory and large scale integration technology. Through use of a modular matrix architecture, full functionality, including loopback, broadcast functions and the like, is achievable for all individual channels. The parallel TSI matrix further provides for modular reduction in order to customize the architecture for particular functional needs. Its implementation with high speed memory and large scale integration technology reduces the size, cost and power requirements by approximately an order of magnitude in comparison to prior art TSI designs.

The simple matrix architecture of this parallel TSI simplifies the processor switch control algorithms since complex connect maps are no longer required. Furthermore, the connect memory associated with the switch blocks forming the matrix architecture of the present invention substantially simplifies the processor algorithms necessary to update the connect memory and consequently, the processor through its reduced overhead is able to perform other tasks or allowed to control more subscriber interconnections per unit of time.

SUMMARY OF THE INVENTION

The present invention is a time slot interchanger having a parallel matrix-type architecture capable of modular expansion of the number of channels which may be switched by the device. The parallel TSI is capable of switching a plurality (N, an integer equal to or greater than one) of switch groups, wherein each switch group comprises up to a maximum number (P, an integer equal to or greater than one) of channels, each of which can be interconnected to any other channel within the same switch group or a different switch group.

For each switch group there is a corresponding group bank which includes switch blocks. Each switch block contains a switch memory having addressable memory locations for the storage of data from one of the switch groups. For instance, if there are three switch groups, then for each group bank there are up to three switch blocks with associated switch memories, one switch block (and therefore one switch memory) for each switch group for which channel interconnections are desired.

Incoming channel data from each switch group is stored in its corresponding switch block switch memory in each group bank. Thus in the above example, channel data for switch group #1 would be stored in switch block switch memories in group banks #1, #2, and #3.

Also associated with each switch block in each group bank is a connect memory. The connect memory also has addressable memory locations. Each such location can contain switch memory address information required for accessing any channel in the corresponding switch memory so as to present channel data on the associated switch group parallel output bus corresponding to any channel associated with that particular switch group.

The actual channel accessed from the desired switch block switch memory for each group bank is determined by the address from the corresponding switch group parallel input bus which addresses a particular location within the particular switch block connect memory for retrieving the actual switch memory address for output of the switch memory data stored therein on the switch group parallel output bus. Each switch block in the corresponding group bank receives the address information, but only the switch block containing valid switch block identification information in the connect memory addressable location is activated.

The combination of the switch memory, connect memory and associated control circuitry is referred to as the above-mentioned switch block. Since any channel of any switch group can be connected to any other channel within the same or different switch group, each switch block within each group bank is uniquely identified so that channel information from only one switch block switch memory location is retrieved and presented on the switch grou parallel output bus at any given interval of time.

In a typical implementation of the present invention, each switch group can comprise up to 1,024 channels (P=1,024), each channel representing one subscriber signal. The data (typically PCM encoded) for each channel of this switch group is written into the switch memory of one switch block for each group bank at a repetition rate of 8,000 times per second (8000 hertz). Each switch group synchronously writes its channel data into its corresponding switch block switch memories for each group bank. The reading of information for each group bank from any desired channel of any switch block switch memory also occurs at the same synchronous repetition rate (time shifted with respect to writing channel data), thereby achieving the desired time switching of any channel from any switch group to any output of any switch group.

It is readily apparent that the use of switch blocks results in a parallel TSI having a matrix configuration. It is also apparent that since each switch block only contains channel information from one switch group, then such a switch block can be eliminated within any group bank if crossconnects to those channels is not desired for that group bank. With this architecture, an easily expandable matrix of switch blocks can be implemented using a modular switch block construction so as to be able to configure the overall TSI system to the total number of channels necessary for a particular switch interconnection app ication.

OBJECTS OF THE INVENTION

It is therefore a principal object of the present invention to provide a parallel time slot interchanger incorporating a modular design which eliminates the need for serial stages in a time slot interchanger.

Another object of the present invention is to provide a parallel time slot interchanger of the above design incorporating a plurality of identifiable switch blocks, wherein each switch block contains switch memory, associated connect memory, and control logic circuitry so as to provide the means for allowing any switch memory address location in any group bank to be read and placed on the parallel output bus of any switch group, thereby achieving a time switch interconnection of any two channels.

Another object of the present invention is to provide a parallel time slot interchanger wherein the switch blocks are fabricated using application specific integrated circuits (ASIC) with integrated high speed memory.

A still further object of the present invention is to provide a parallel time slot interchanger further incorporating serial bus interface (SBI) links for interfacing a plurality of serial channels with the parallel address and data architecture of the switch blocks associated with the parallel time slot interchanger.

An additional object of the present invention is to provide a parallel time slot interchanger incorporating a processor interface for updating switch memory address information stored in the connect memories associated with any switch block and further wherein the control circuitry of each switch block is capable of determining if particular channels within the switch group are unused and if unused, providing the time normally used for the writing and reading channel data (to the switch memory) to the processor for updating the connect memory switch memory address information while such operations remain transparent to the overall operation of the parallel time slot interchanger.

A further object of the present invention is to provide a parallel time slot interchanger incorporating a processor for updating switch memory address information stored in the connect memories associated with any switch block and further wherein the control circuitry of each switch block is capable of determining if a concurrence exists between the channel time slot address and the connect memory address with a pending processor read or write request, and if a concurrence exists allowing access of the particular connect memory address location by the processor.

BRIEF DESCRIPTION OF THE DRAWINGS

For a further understanding of the nature and objects of the parallel time slot interchanger, reference should be made to the following detailed description taken in combination with the accompanying drawings, in which:

FIG. 1A is a diagram of the switch memory address structure.

FIG. 1B is a diagram of the connect memory address structure.

FIG. 6D is a diagram showing how to combine FIGS. 6A-6C to form FIG. 6.

BEST MODE FOR CARRYING OUT THE INVENTION

Figure 1:
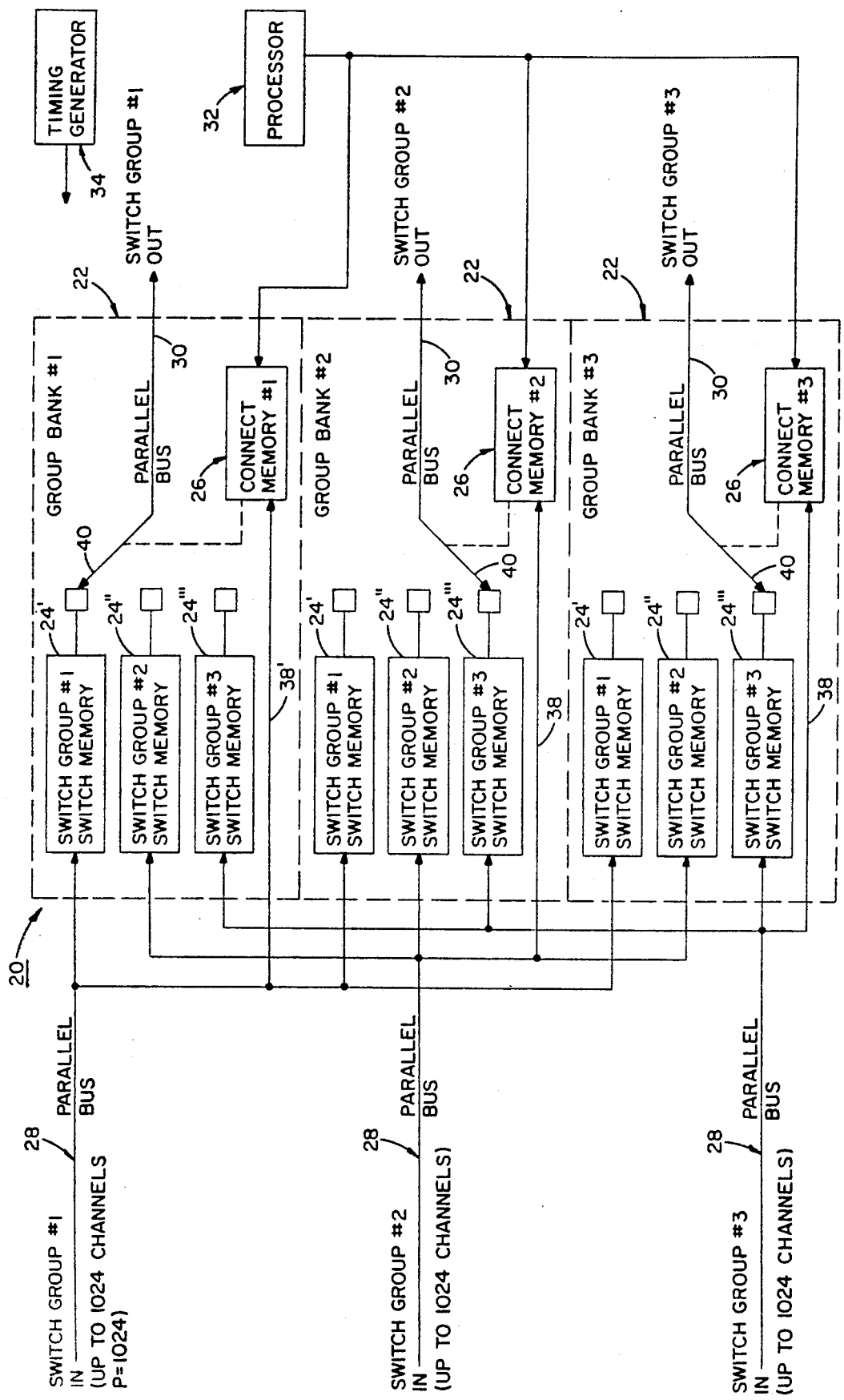
FIG. 1 is a block diagram of a prior art parallel time slot interchanger illustrating the manner in which channels associated with three switch groups are interconnected by means of associated switch memories and connect memories.

The general architecture of a prior art parallel time slot interchanger (TSI) 20 is shown in FIG. 1. This figure is a block diagram for interconnection of three switch groups (#1, #2 and #3) wherein each group typically contains up to a maximum number (P) of channels, such as 1,024 channels. The purpose of the parallel TSI is to provide switching between any channel in any switch group to any other channel in any switch group, including the same switch group. Channel data is input on a corresponding switch group parallel input bus 28 and is output on a switch group parallel output bus 30 for each switch group.

For each switch group, the parallel TSI comprises a corresponding group bank 22 which contains the necessary circuitry and memory for performing the desired channel interconnects. For instance, group bank #1 can interconnect any channel from switch groups #1, #2 or #3 to any of the output channels for switch group #1. In order to accomplish this result, the group bank comprises switch memories 24, one such memory in each group bank for each incoming switch group channel. For the three switch group parallel TSI configurations shown in FIG. 1, there are therefore three switch group memories in each group bank, each switch group memory corresponding to one of the incoming switch groups.

The group bank further comprises a connect memory 26 which contains the information needed to map each output channel of switch group #1 to one and only one address location in on of the switch group memories corresponding to one channel of one incoming switch group.

In typical operation, each switch group channel is written into its corresponding switch group memory in each group bank on a highspeed repetitive basis. Each channel is sequentially written into a switch memory location in each group bank during one unique time slot. Each time slot is long enough in duration to allow a read operation of the switch memory to take place as well. The data written into the corresponding switch memory location typically is pulse code modulation (PCM) data sampled at an instant of time for a particular subscriber channel. Other types of data encoding is of course possible. Such PCM data typically comprises eight bits of information representing the amplitude of the signal at a sampled interval of time. The information written into a particular switch memory address location is maintained there until a new PCM unit of information is again written to that location from the particular switch group channel during the next occurrence of that unique time slot. If the incoming data written to a particular switch memory address is read from that address at the same repetitive basis (but generally not necessarily during the same channel time slot) on a parallel output bus 30, then the subscriber channel written into a particular switch memory address location is transferred to a particular channel for a particular parallel bus switch group output.

In a typical configuration, each of 1,024 subscriber channels have their PCM encoded data written into one of 1,024 address locations of the switch memories corresponding to that switch group at a rate of 8,000 times per second (8,000 hertz). Thus each unique time slot occurs 8,000 times a second. For such a configuration of 1,024 channels per switch group, each switch group switch memory 24 has at least 1,024 addressable memory locations 31, as shown in FIG. 1A. For a given switch group, the eight bits of PCM data corresponding to each channel is written into one of the switch group memory addressable locations at a rate of 8,000 times per second. The particular switch memory address location that a particular input channel is written into is arbitrary for any particular switch group, although the particular location written into in its corresponding switch group switch memories is the same for each memory in each group bank. For instance, if subscriber channels #0 through #1,023 for switch group #1 are written into address locations 0 through 1,023 in switch group #1 switch memory 24', this addressing of the incoming data is the same for the switch group #1 switch memories 24' in group banks 2 and 3 as well. Such addressing information is not received from the PCM encoded data but rather is produced by circuitry forming part of associated serial bus interfaces (if present) or from circuitry external to the parallel TSI. Such addressing circuitry is well known in the art.

It should be noted however, that the incoming data for the other switch groups, such as switch groups #2 and #3 shown in FIG. 1, with regard to their corresponding switch memories (in group banks #1, #2 and #3) need not use the same address mapping as that used with respect to the channels for switch group #1. Thus for instance, the incoming subscriber channels on switch group #2 for its parallel bus input 28 can be mapped to different address locations in its switch group #2 switch memories 24". Instead of a sequential mapping to addresses 0 through 1,023 for incoming channels #0 through #1,023, the channels could, for instance, be mapped to entirely different address locations for switch group #2 switch memories. For instance, channel #0 for switch group #2 could be written into address location 0002 for switch group #2 switch memories, while channel #1 could be written into address location 1,023. The only requirement is that each incoming channel for each switch group be written into a single address location for its corresponding switch group switch memories and that this particular address location be the same for each switch group switch memory for that particular switch group. Consequently if channel #20 of switch group #2 is written into address location 0049 for the switch group #2 switch memories, this address is used for each switch group #2 switch memory in each of the group banks.

Just as the incoming switch group channel data is written into the corresponding switch group switch memories at a repetitive rate, the data read from these switch memories on the (such as 8,000 hertz) parallel output buses 30 for each switch group is also performed on an identical repetitive basis. Conceptually therefore, since each incoming channel is written into its corresponding switch memory address location at a rate of 8,000 times per second and since a read operation is also performed during each time slot, and further since there are typically 1,024 channels per switch group, each switch group channel has a time slot for writing and reading its data into its corresponding switch group switch memory address equal to approximately 122 nanoseconds. This length of time is equal to the cycle period T, represented by an 8,000 hertz repetition rate, where T, is equal to 1/f, and where f is the repetition rate, divided by the total number of channels. Thus the cycle period of the 8,000 hertz repetition rate is equal to 1/8,000, or 0.000125 second, which equals 125 microseconds. Since 1,024 channels are each written into memory on a sequential basis during this 125 microsecond cycle period, the actual length of time for a time slot is: 0.000125/1,024, or 0.000000122 second, or approximately 122 nanoseconds.

As seen in FIG. 1A, PCM and control data for a channel is typically 16 bits in length (8 bits PCM data and 8 bits control data) and thus the parallel input bus 28 writes these 16 bits of data into the particular switch memory address location during a time slot of 122 nanoseconds and this data is repeatedly written into that particular address location once every 125 microseconds. Since the writing and reading of data from each switch memory occurs during the same 122 nanosecond time slot, and since such writing and reading must not be performed at the same time, the actual writing of data to a particular address location occurs during the first 61 nanoseconds period of the 122 nanosecond time slot, while the reading of data from a switch memory address location occurs during the second 61 nanoseconds period of a time slot. Thus the time slot associated with each switch group channel represents both a write and a read operation.

It should further be noted that each switch group writes data into its corresponding switch group switch memories on a synchronized basis with all the other switch groups. Thus the data for the channels of switch group #3 are written into the switch group #3 switch memories 24'" during the same 61 nanosecond time period as the channel data written into the switch group switch memories corresponding to switch groups #1 and #2.

In addition, the reading of data from the switch group switch memories also occurs synchronously during the read time interval for each switch group.

The parallel input bus 28 for each switch group contains both data and address lines, both of which are connected to the switch memories corresponding to the particular switch group. For switch group #1, parallel bus 28 is connected for both its data and address lines to switch group #1 switch memories 24' in group banks 1, 2 and 3. The address lines corresponds to the address of a particular channel and effectively causes that channel of data to be stored in the designated address of the switch memory.

As also seen in FIG. 1, the connect memory 26 in each group bank 22 controls which switch memory 24', 24", or 24'" is connected to the parallel output bus for the corresponding switch group as well as which address of the selected switch memory is accessed for data transfer to this output bus for any given time slot. The switch memory address information stored in the connect memory is received from a processor 32. The processor access to the connect memories, the writing and reading of channel data information into the switch memories for each of the switch groups, as well as reading switch memory address information from the connect memory of each switch group, is synchronously controlled by a timing generator 34.

In operation, the connect memory 26 of each switch group receives address information along parallel address bus 38 forming part of the parallel input bus 28 for the corresponding switch group. Thus for group bank #1, address information along parallel address bus 38' corresponds to switch group #1. If for instance channel #54 of switch group #1 is being written into switch group #1 switch memories during channel time slot 0054, the address information, i.e. address 0054, is presented to connect memory #1. This address information is not remotely transmitted to the TSI (as is the PCM encoded data) but rather is locally generated by well known circuit techniques based upon the channel time slot information. The connect memory accesses its address location 0054 so as to retrieve switch memory address information stored at this address. The retrieved switch memory address information determines which switch group switch memory (that is switch memory #1, or #2, or #3 of group bank #1) and which channel of that switch group (based upon the switch memory address) is to be read during this 54th time slot. This information is then presented on parallel output bus 30 for switch group #1. Arrow 40 thus diagrammatically represents the selection of the particular switch memory as determined by the information stored in the connect memory at the address of the incoming channel from the corresponding switch group.

Figure 2:
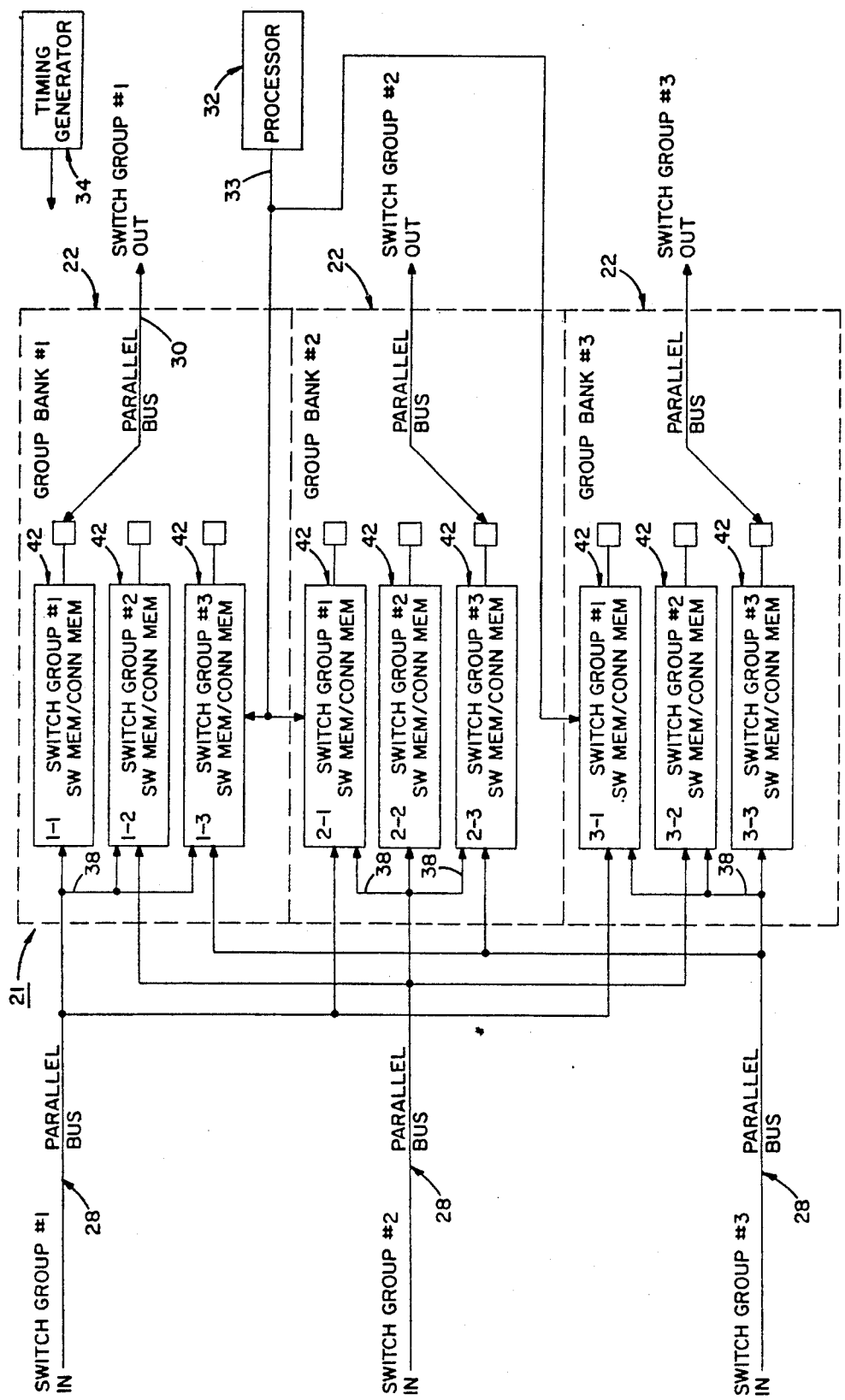
FIG. 2 is an overall block diagram of a parallel time slot interchanger according to the present invention wherein the connect memories of each group bank are distributed amongst the switch memories of the corresponding group bank, with the combination of switch memory, connect memory and associated control circuitry referred to as a switch block.
Figure 3:
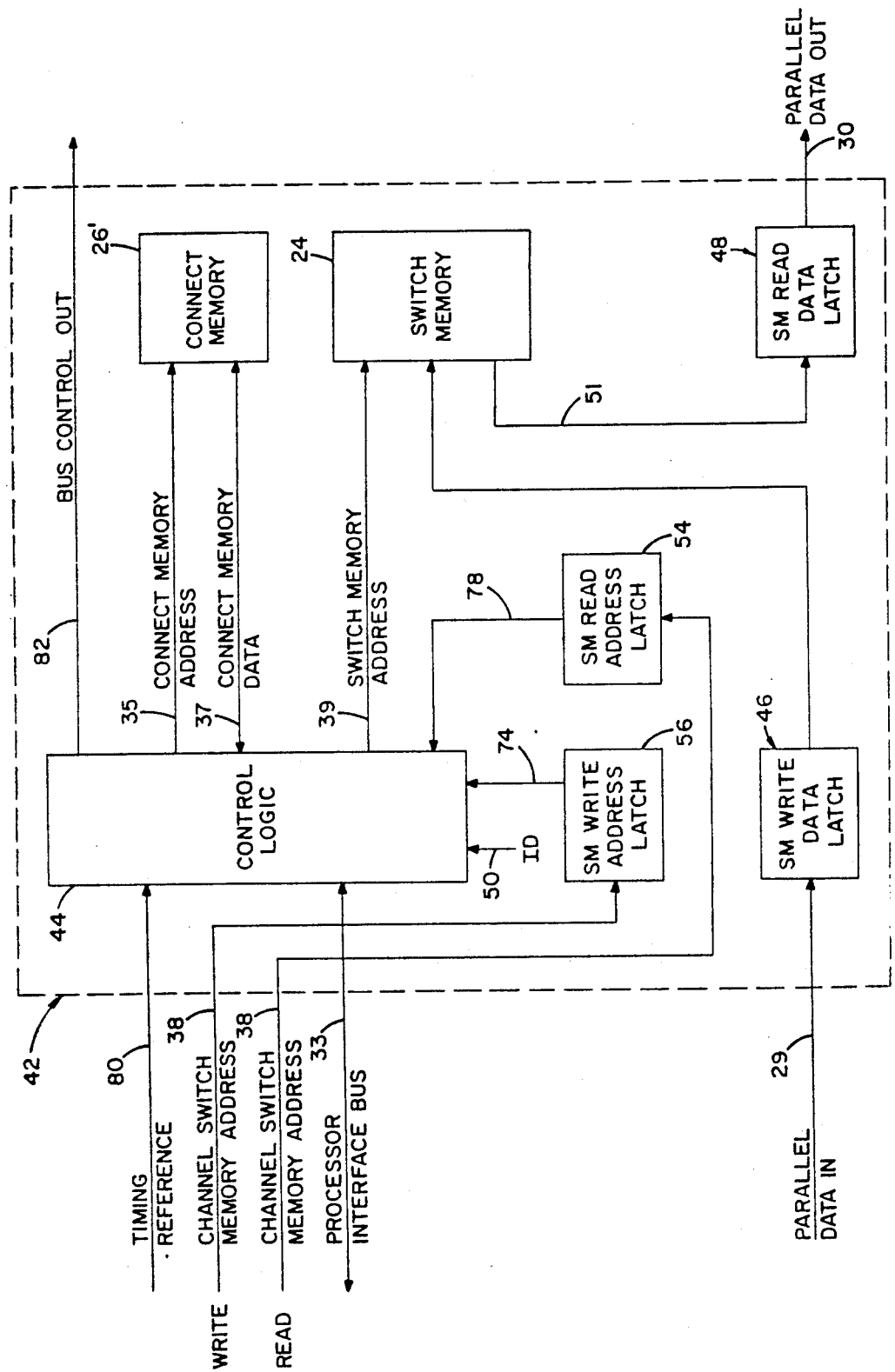
FIG. 3 is an overall block diagram of a switch block used in the parallel time slot interchanger shown in FIG. 2.

The prior art parallel time slot interchanger shown in FIG. 1 is not modular in design insofar as the connect memory 26 for each group bank is separate from the switch memories associated with that group bank. As shown in FIGS. 2 and 3, the parallel time slot interchanger 21 according to the present invention introduces a new concept; namely, a switch block 42 which incorporates both switch memory 24 and connect memory 26' with the connect memory dedicated to switch memory address information for the corresponding switch memory. In effect, the connect memory module 26 for each group bank shown in FIG. 1 now is distributed amongst the switch blocks of the corresponding group bank.

Figure 4:
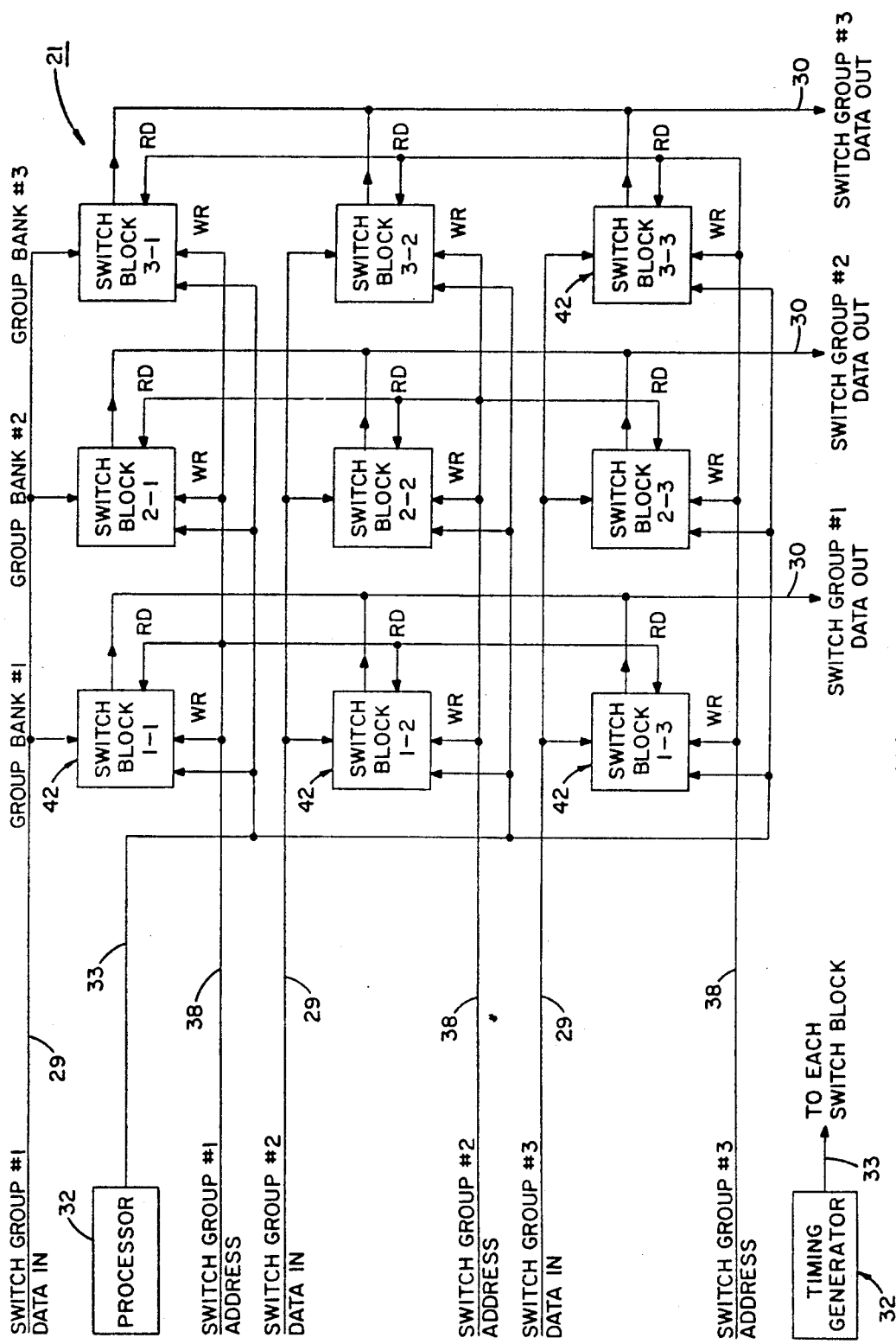
FIG. 4 is an overall block diagram of a 3×3 matrix parallel time slot interchanger illustrating the interconnection o switch group input channel data and switch group channel addresses, as well as the data output associated with each switch group of channels.

Through use of this modular matrix design, a parallel time slot interchanger for a typical application comprising three switch groups has an overall configuration as shown in FIG. 4. Each switch block can be identified as part of an array denoted by subscripts i and m, where i and m are both integers, and further where i denotes the group bank number (and thus the switch group number) of the associated group, and m denotes the switch group number from which channel data is received. For instance, switch block$_{1,2}$ denotes a switch block in group bank #1 which receives channel data from switch group #2. Switch block$_{3,2}$ denotes a switch block in group bank #3 which receives channel data from switch group L #2.

This switch block building block concept is preferably implemented using large scale integrated circuit technology and preferably can be implemented through use of application specific integrated circuits (ASIC's) with integrated high-speed memory.

As shown in FIG. 3, each switch block not only contains a distributed connect memory 26' and a switch memory 24, but also contains control logic circuitry 44, an input data register (latch) 46, an output data register (latch) 48 and switch memory read and write address latches 54 and 56.

The implementation shown in FIG. 2 includes address information on bus 38 for accessing one connect memory address per time slot, with only one connect memory per group bank validly accessed per time slot. For instance, if channel #25 of switch group #1 is to cause a switch memory location in switch group #2 to be output on parallel output bus 30, then the connect memory for ([switch group #2 switch block 42' (switch block$_{1,2}$) is accessed, which in turn accesses a particular address location in the switch memory for that switch block. Thus the configuration for the distributed parallel time slot interchanger shown in FIG. 2 requires that the connect memories of each group bank be addressed in such a fashion that for any given time slot only one connect memory address output is enabled and capable of addressing its associated switch memory address information. This result can be achieved in a number of ways. One preferred method is that each connect memory address location contains a field for storage of switch block identification data. Only the switch memory data in the same switch block as that identified in the switch block identification field is enabled. Each switch block includes a hardwired identification 50 for use in this comparison process.

More particularly, FIG. 1B illustrates the internal memory configuration of a connect memory. Each addressable location 61 contains 16 bits of data. Of these 16 bits, a 10 bit field 64 is used to identify a switch memory address location ($2^{10}=1024$) and a 3 bit switch block identification (ID) field 63 is used to identify any one of up to eight switch blocks ($2^3=8$) in one group bank. If a larger number of switch blocks are present, the number of bits in the ID field can be increased. When switch memory address information is written into a connect memory addressable location 61, a switch block ID for one switch block of the group bank is also written into the ID field. When a read operation is performed, the same address location 61 of each connect memory is interrogated. Only the connect memory within the switch block having the same ID as the ID field at the particular address location determines what switch memory address data is output on bus 30.

It should be noted that during a write operation, the same address information from address bus 38 is simultaneously presented to the corresponding address location 31 (see FIG. IA) of each switch memory 24 for the corresponding switch group in each group bank. For instance, for switch group #1 the write address for the selection of an address in the switch memories for switch group #1 is presented to switch group #1 switch memories in group banks #1, #2 and #3 (switch block$_{1,1}$, switch block$_{2,1}$, and switch block$_{3,1}$ of FIG. 4). As described above, it is also presented to the connect memories 26' of each switch block of group bank #1 (switch block$_{1,1}$, switch block$_{1,2}$, and switch block$_{1,3}$). In each group bank, only the switch memory associated with the channel to be read at a particular time slot is enabled by comparison of connect memory switch block ID data bits read at the connect memory location to the switch block identification number.

For example, as seen in FIG. 4 for switch group #1, the switch address for writing data is presented to switch block$_{1,1}$, switch block$_{2,1}$ and switch block$_{3,1}$ corresponding to group banks #1, #2 and #3. During the read cycle the same address is presented to all the connect memories in group bank #1; namely, switch block$_{1,1}$, switch block$_{1,2}$ and and switch block$_{1,3}$. Only the connect memory in the switch block with ID data that matches the hardwired switch block ID determines what switch memory data is accessed for output on the parallel bus 30.

Figure 5:
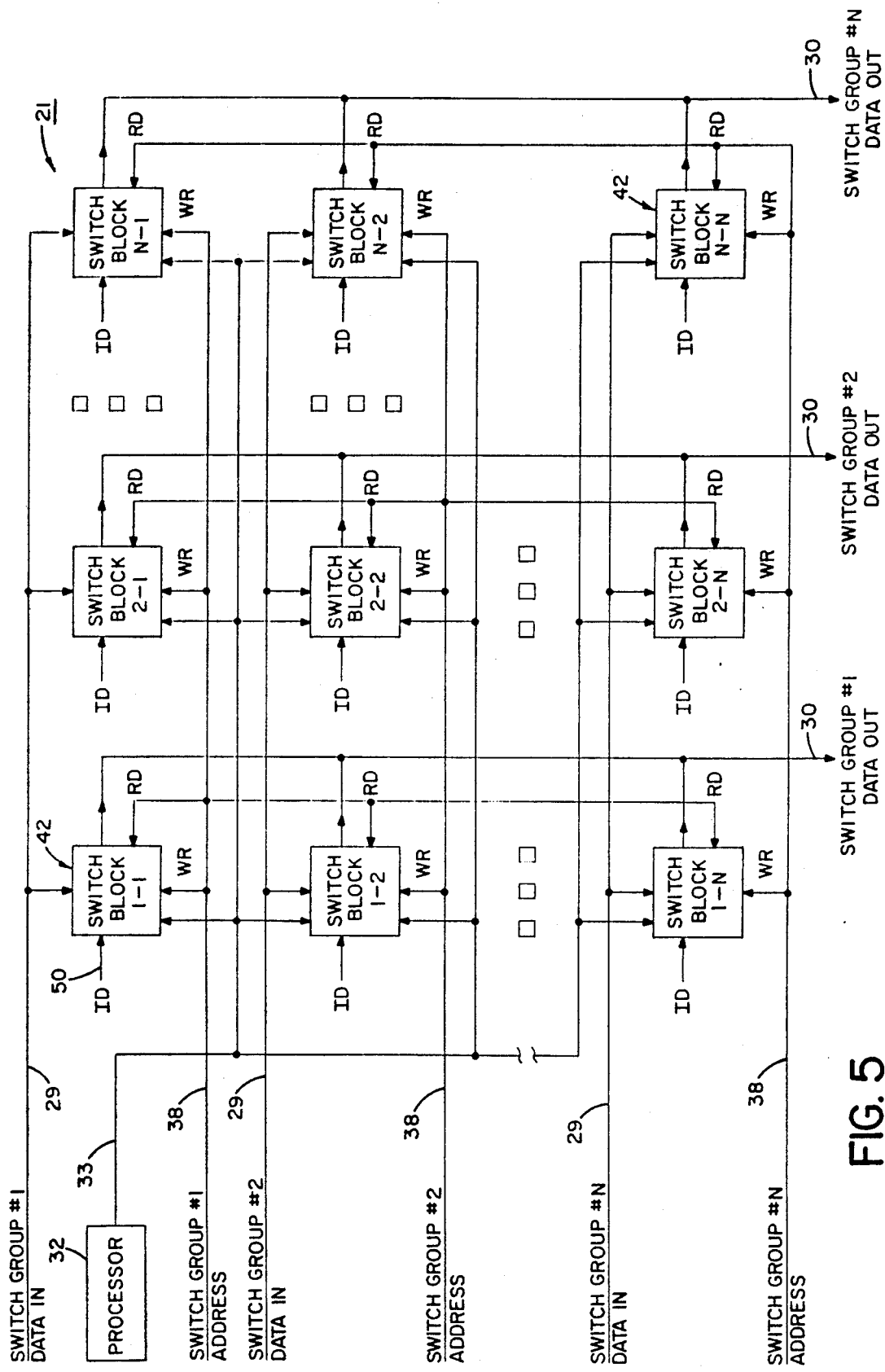
FIG. 5 is an overall block diagram of a matrix parallel time slot interchanger for up to N switch groups, illustrating that up to $N^2$ switch blocks are associated in such a matrix configuration.

As is evident from FIG. 4, which illustrates a parallel TSI employing switch blocks 42 in a 3×3 matrix, the modular design of such a parallel TSI allows the structure to be increased in size to virtually any number of switch groups such as illustrated in FIG. 5. For large scale integrated circuit implementation of such a parallel TSI architecture, the only limitations with regard to the matrix size are the number of address lines needed for purposes of selecting the switch memory addresses as well as the particular connect memory to be used for a given read operation for a given group bank during any channel time slot.

Typical requirements for an average size telecommunications switch requires between approximately 5,000 and 10,000 non-blocked channels and thus a 9×9 parallel TSI matrix, where each switch group comprises 1,024 channels, provides 9,216 non-blocking channels along with interconnect between any channels. Such a 9×9 parallel TSI matrix in addition to providing for non-blocking channel with interconnect between any channels can also provide broadcast, loopback, bridging, terminating and switch with equal propagation delays of channels in any channel group due to the inherent nature of this matrix parallel TSI structure.

For transmission network functions such as a synchronous optical network (SONET) add drop multiplexor or for a terminal multiplexor, cross-connection functions of approximately 3,000 channels or less are required. To achieve such an implementation, a 3×3 parallel TSI matrix can be used. As is readily apparent to those skilled in the telecommunications switching art, the size of the parallel TSI matrix of the present invention can also be modified if trade-offs are made concerning the use of various features and requirement for complete interconnect capability of all group channels.

For instance, if features such as loopback are not required, the matrix can be depopulated with regard to the number of switch blocks necessary, thus reducing the size, power, heat generation and cost for a particular implementation. For example, if a 3×3 parallel TSI matrix is used in an add drop multiplexor application with the dropped local channels attached to switch group #1, the east direction transmission facility attached to switch group #2, and in the west direction transmission facility attached to switch group #3, and if the east/west transmission facilities do not require loopback capability, then switch block$_{2,2}$ and switch block$_{3,3}$ shown in FIG. 4 can be removed. The reason for such removal is that loopback capability requires channel interconnections for the same switch group and thus if such interconnections are not required, the switch block which would implement such group interconnections can be eliminated. For each switch group, the switch block which effectuates channel interconnections of that group is the switch block whose connect memory is dedicated to the same group as the incoming channel data, that is to switch block$_{n,n}$, where n is equal to the switch group number in question. Similarly, if interconnections are not required from switch group j to switch group k, (j and k both integers), then switch block$_{k,j}$ can be eliminated.

The configurations shown in FIGS. 4 and 5 thus correspond and achieve the function for the parallel TSI shown in FIG. 2 using switch blocks shown in FIG. 3, wherein each group bank corresponds to a column of switch blocks, such as switch block1,1, switch block$_{1,2}$ and switch block$_{1,3}$ corresponding to group bank #1.

APPLICATION SPECIFIC INTEGRATED CIRCUIT IMPLEMENTATION

A parallel time slot interchanger matrix according to the present invention is preferably implemented using applications specific integrated circuits (ASIC's). This large-scale integration technology has currently emerged in the form of approximately 10,000 usable gates with up to 36 kilobits of internal memory per chip. In particular, the architecture shown in FIGS. 2, 3 and 4 can be implemented with a slight rearrangement such that each switch memor 24 in each group bank 22 has the control logic 44 and connect memory 26' of that group bank duplicated for each switch memory. In such a configuration, the combination of the connect memories, switch memory, control logic and latches comprises the switch block 42 shown in FIG. 3.

Figure 6A:
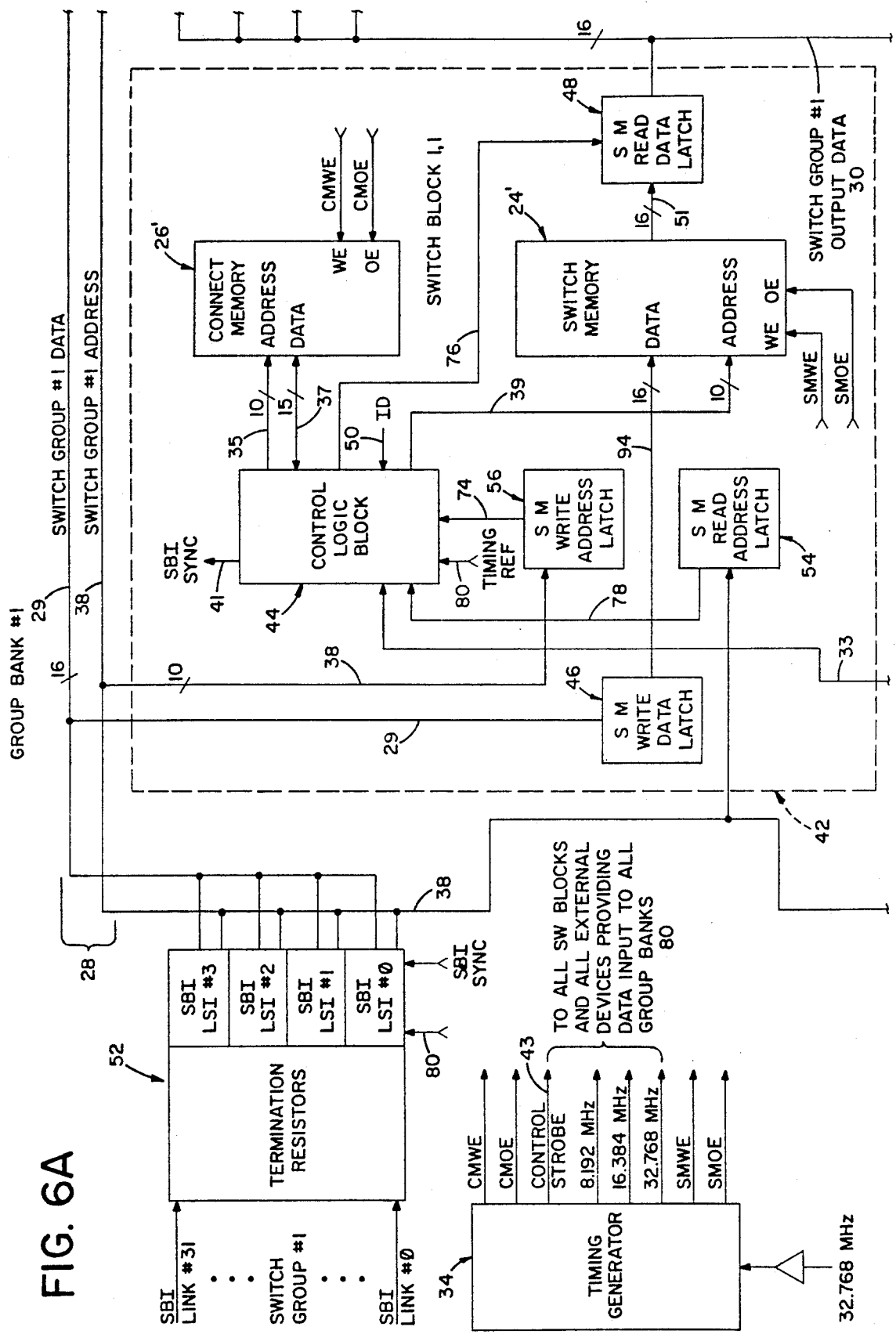
FIGS. 6A-6C combine to form a detailed functional block diagram of a portion, of the parallel time slot interchanger shown in FIG. 5.
Figure 6B:
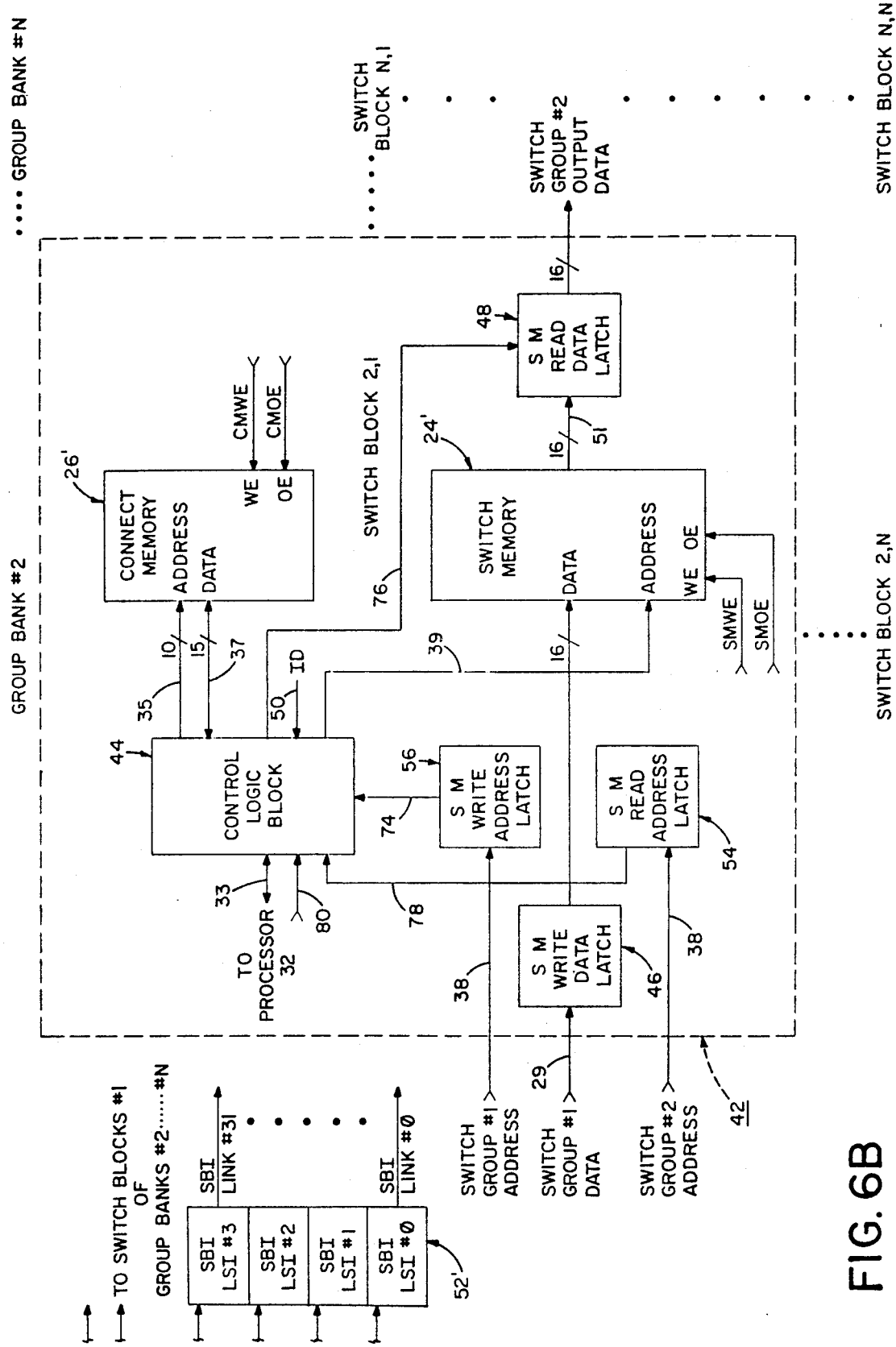
Figure 6C:
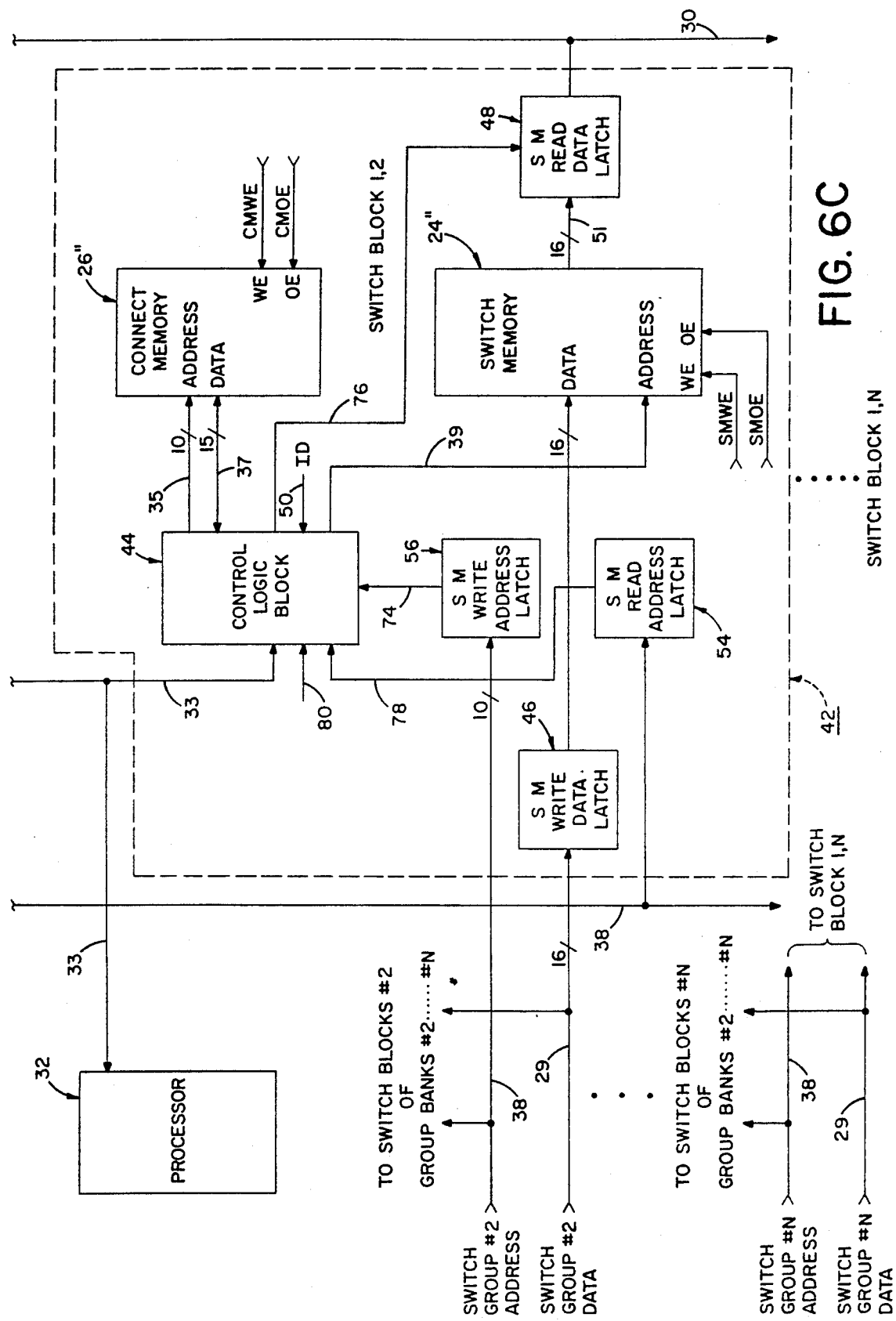

FIG. 6 comprising FIGS. 6A-6C is a block diagram of a parallel TSI matrix according to the present invention which is implemented using ASIC circuitry. As shown in FIG. 6, each group bank 22 is associated with a group of channels (P) for a corresponding switch group, such as 1,024 channels (P=1024) with incoming data received on corresponding parallel data bus 29. Channel address information is presented on address bus 38. The combination of parallel data bus 29 and address bus 38 forms the input parallel bus 28. The output data is presented on a parallel output bus 30 for each group bank.

Switch group #1 further incorporates use of serial bus interface links 52 and 52' (FIGS. 6A and 6B) which convert serial incoming data (links 52) into parallel data and outgoing parallel data into serial data (links 52'). Each serial bus interface link typically contains 32 channels and therefore if a switch group contains 1,024 channels, 32 SBI links are required (32 times 32 =links are contained on a single large-scale integrated (LSI) device (devices SBI #0, #1, #2, and #3).

It should be noted that the use of serial bus interface links to convert serial incoming channel information into parallel data is not required for a parallel TSI implementation but is shown as one type of interface which can be used in conjunction with a parallel TSI matrix system. It should further be noted that timing generator 34 is common to all group banks.

Since the incoming parallel data on bus 29 comprises 16 bits, each switch memory 24 requires a 1,024 by 16 bit configuration. This memory is resident within the ASIC chip.

All connect memories 26' are random access memories requiring a configuration of 1,024 words, each having 15 bits in length. This memory is also resident within the ASIC chip.

As seen in FIG. 1B, two bits of the fifteen bit connect memory word define strobe bit data 62 reserved for programmable strobe bits used for synchronization of external events such as an address reference for all the parallel data bus outputs. Ten of the remaining connect memory address bits define the switch memory address field 64 used to address one of the 1,024 sixteen bit words in the corresponding switch memory 24 ($2^{10}=1,024$). The three remaining address bits define the switch block identification field 63 used in conjunction with the switch block ID's 50 to indicate which connect memory determines what data is read during the corresponding read subchannel period (61 nanosecond). These bits are also read and written by processor 32 for purposes of changing the desired channel interconnects (that is, changing the data stored in the connect memory fields).

As seen in FIGS. 2, 4, 5 and 6, a connect memory 26' is associated with each switch group in each group bank. As explained above, the purpose of the connect memory is to provide switch memory address information for determining which switch memory address is to be accessed for output of its data on the parallel output bus of the corresponding group bank during any particular time slot. However, since each connect memory 26' associated with each switch block 24 is able to access switch memory address locations only for the switch memory 24 in the same switch block, it is necessary that a determination be made for any given time slot (that is, for any given input address received on address bus 38 of parallel input bus 28) as to which switch block data is output for that time slot. As explained above, a preferred method of making this determination is to compare the contents of each connect memory's switch block ID field 63 with the actual switch block ID number 50. Only if a match occurs is the corresponding switch memory data output on bus 30.

In practice, this technique reduces the programming overhead of interconnected processor 32 which is responsible for maintaining the ID field 63 and switch memory address field 64 of each addressable location 61 of each connect memory. As explained more fully below, the processor simply writes the same ID information and switch memory address information into the same addressable location 61 of each connect memory within a group bank (such as connect memories 26, in switch block$_{1,1}$, switch block$_{1,2}$ and switch block$_{1,3}$ of group bank #1). Since the ID information only matches one actual switch block ID 50, only the switch memory output data latch 48 of this particular switch block is enabled during a read operation for that addressable location (channel or time slot).

For instance, if there are 8 switch groups (N=8) then there are up to 8 switch blocks (and therefore 8 connect memories) in each group bank. The ID's for these 8 switch blocks would be 000, 001, 010, 011, 100, 101, 110, and 111, which represent the binary equivalent of a range of numbers from zero to seven. If processor 32 writes binary 101 into ID field 63 of each connect memory for the 20th address location (that is for channel #20 or time slot #20), then the sixth switch memory data (switch block$_{1,6}$) would be output for that channel since binary 101 equals 5.

A second technique for making the same type of determination is that each connect memory address location containing switch memory address information also contains a flag bit so that the corresponding control block 44, upon receipt of a switch memory address (time slot) on address bus 38 equal to the address of a connect memory address location, is able to determine if the flag is set or not. Only if the flag is set is that particular connect memory data used to enable a switch memory read.

In this second technique, if a particular time slot is to be associated with a different switch group switch memory for purposes of a read operation, then the processor must first remove (or unflag) the flag bit in the previous connect memory and write the new switch memory address information with the flag bit set into the desired connect memory corresponding to the switch block associated with the desired switch group switch memory.

In order for processor 32 to write information into a connect memory address location for a connect memory in a particular switch block, it must be able to read the switch block ID 50 which uniquely identifies that switch block within a given group bank. In this manner only one switch block of a group bank is accessed for purposes of a read operation during any time slot. In effect, the switch memory address information for a given group bank is effectively distributed amongst the connect memories in the switch blocks associated with that group bank.

Control Block 44

Control block 44 contains logic for controlling the data transfer functions. Timing generator 34 synchronizes the control logic functions performed by control block 44, including synchronization of all read/write operations to the corresponding switch memory 24 and between connect memory 26' and processor 32 via processor bus 33.

The 8.192 MHZ, 16.384 MHZ, 32.768 MHZ clock signals and control strobe 43 are each presented to a control timing module 90. These signals are shown as a timing reference signal 80. Timing output 82 of module 90 is used to synchronize the operations of the other modules forming control logic block 44.

For switch memory write operations the control logic block generates the address on output 39. As seen in FIG. 6A this address information is initially presented to switch memory write address latch 56 from address bus 38. Output 74 is presented to the switch memory address select module 92 (see FIG. 8) which in turn generates the switch memory address information on bus 39.

As seen in FIG. 6A, data bus 29 presents the encoded data (such as PCM data) to the switch memory data latch 46. Output 94 from this latch then presents the encoded data to the switch memory at the selected address.

Figure 8:
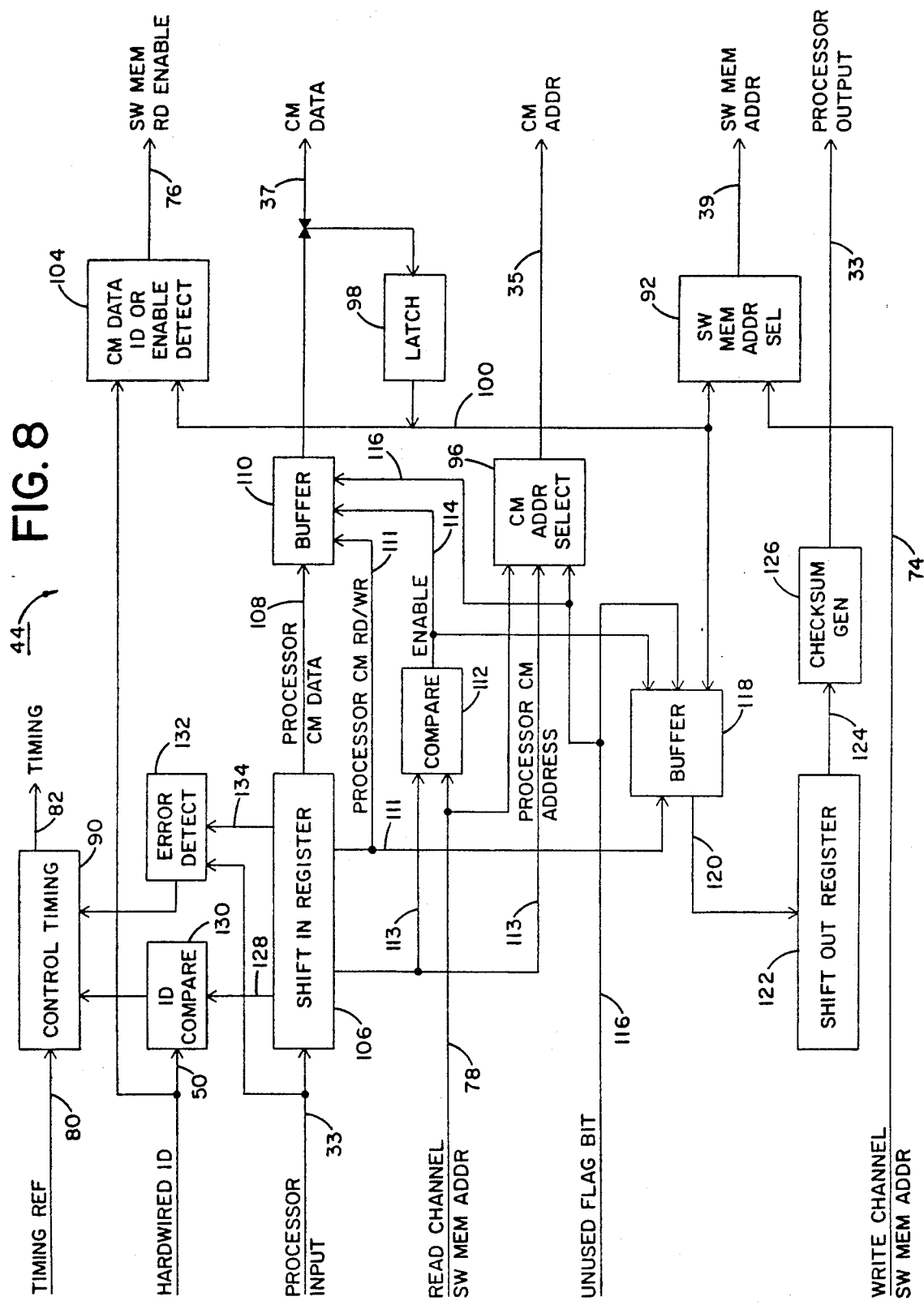
FIG. 8 is a detailed block diagram of the control logic block.

For switch memory read operations address information from bus 38 is presented to switch memory read address latch 54 (see FIG. 6A). The switch memory address data from latch 54 is presented to the control logic block 44 via bus 78. As seen in FIG. 8, this address information is presented to connect memory address select module 96. Output 35 of module 96 is then presented to the connect memory of the corresponding switch block as shown in FIG. 6A.

The selected address of the connect memory outputs its connect memory data on output 37 which is connected to latch 98 of logic block 44. The latched connect memory data which represents the address of the switch memory for potential output on bus 30 is presented to switch memory address select module 92 via bus 100. Output 39 of module 92 presents the address to the switch memory which in turn outputs switch memory data on its output 51 (see FIG. 6A) to switch memory read data latch 48. Such an operation occurs for each switch memory of the corresponding group bank.

However only one switch memory read data latch is enabled for each group bank. This result is due to the fact that only one identification field 63 forming part of the 15 bit connect memory data output by latch 98 corresponds to a switch block identification 50. This comparison is performed by the connect memory data identification module 104 whose output 76 enables the corresponding switch memory read data latch 48 (such as shown in FIG. 6A).

Control logic block 44 also interfaces processor 32 to the corresponding switch block connect memory for purposes of writing or reading data thereto. For such a read or write (read/write) operation the processor read/write address will cause access to a connect memory if this read/write address matches the current switch memory read address on bus 78 (see FIG. 8). More particularly, the processor read/write address and corresponding data is presented on bus 33 to a shift in register 106. For write operations, the connect memory data is output on bus 108 to buffer 110. A comparison of the read/write address is made by comparator 112 which receives the processor read/write address on bus 113 and compares it to the current read channel switch memory address on bus 78. For processor write operations, if a comparison is found, output 114 is enabled which in turn gates the connect memory data out of buffer 110 to the connect memory on bus 37 for writing and to latch 98 for the current switch memory read operation. For processor read operations, if a comparison is found, output 114 is enabled which enables buffer 118 to transfer the output of latch 98 from the current control memory read operation to bus 120 which is connected to the shift out register 122. The read or write nature of the data in buffer 110 is determined by processor connect memory read/write information 111.

Preliminary to this data transfer, the connect memory read/write address on bus 113 is presented to the connect memory address select module 96 which addresses the specified connect memory address via bus 35. Furthermore a comparison of the processor input as output on bus 128 to ID compare module 130 is made to insure that processor read/write operations do not take place unless the desired group bank or switch block is accessed. The error detect module 132 is used to prevent switch block timing if an error is detected regarding the processor input or data from shift in register 106 via output bus 134.

Processor access to the connect memory is also allowed when the eleventh data bit 116 (if present) of the switch group address indicates an unused channel (time slot). As seen in FIG. 8, this flag bit also enables buffer 110.

For connect memory data transfer to processor 32, output 120 of buffer 118 is presented to shift out register 122. Output 124 of register 122 is presented to checksum (or parity) generator 126. Its output is connected to processor bus 33 for transfer to processor 32.

Serial Bus Interface

For group bank #1 shown in FIG. 6A, serial bus interface (SBI) links 52 and 52' implemented in large-scale integrated circuits provide the serial to parallel and parallel to serial conversion for all subscriber channels. Such SBI links are not part of the present invention but are shown to accurately illustrate a typical interconnection of subscriber channels to a parallel TSI. In the serial to parallel conversion process, the SBI links each receive 32 serial channels, each with a bit rate of 4.096 megahertz. Each of the links contains 32 sixteen bit channels with a synchronization word in channel #0. The serial bus interface links shift in data, synchronize the data upon occurrence of the sync word, convert all data to parallel data words, buffer all data words for alignment with the TSI channel timing and gate out each data word with the SBI channel switch memory write address (as determined by the channel time slot) to all switch blocks corresponding to the switch group in each group bank when strobed by timing generator 34.

Since there are 32 SBI links (with each link connected to 32 channels) the channels associated with a particular link are mapped to the switch memories for that switch group in each of the group banks with the particular SBI link identified by the most significant 5 bits of the 10 bit address ($2^5 = 32$) and the actual channel number for the particular link to be written is identified by the least significant 5 bits of the 10 bit address associated with the switch memory. Thus with reference to FIG. 1A, switch memory addresses 0–31 could be associated with the first SBI link. The last five bits (the least significant bits) of the switch address thus identify which one of the 32 switch addresses is to receive data during a given time slot.

In the parallel to serial conversion process, the SBI links 52' receive data from parallel output bus 30 upon strobing by the timing generator 34. The channel address for the SBI link to receive this data is the same as the channel corresponding to the switch memory address of the data word which was sent to the TSI group banks six channel subperiods earlier where each channel subperiod is 61 nanoseconds in length. The word taken into the output SBI link is buffered to align it with the SBI link transmit channel timing and then serially shifted out of the serial bus interface using the same 4.096 megahertz clock.

Bus

Bus 28 associated with group bank #1 has a 26 bit size, while the parallel bus 28 associated with group banks #2 and #3 each have a 27 bit size with the extra bit representing a valid/invalid channel identifier flag 116 (See FIG. 8). This flag is used to identify an unused subscriber channel as described more fully below.

Each of the three switch group parallel input buses 28 are time division multiplexed and can carry up to 1,024 channels to the parallel TSI. The 26 bit parallel bus represents 10 bits of switch memory addressing and 16 bits of data. The 16 bits of data comprise 8 bits of service data (PCM, etc.) and 8 bits of control data.

The output of group bank #1 is placed on a sixteen bit parallel data bus 30 which carries 1,024 channels to the outgoing SBI's 52'. The time division of the input and output parallel busses 28 and 30 are such that 1,024 subscriber channels can be carried by each parallel bus with each of the 1,024 channels repeating every 125 microseconds. This equates to a TSI channel cycle period of approximately 122 nanoseconds (125 microseconds divided by 1,024 channels).

Each parallel bus channel period is equivalent to and phase aligned with two TSI subchannel periods with each TSI subchannel period being approximately 61 nanoseconds in length and every other subchannel period representing a write or a read operation.

Timing

Figure 7:
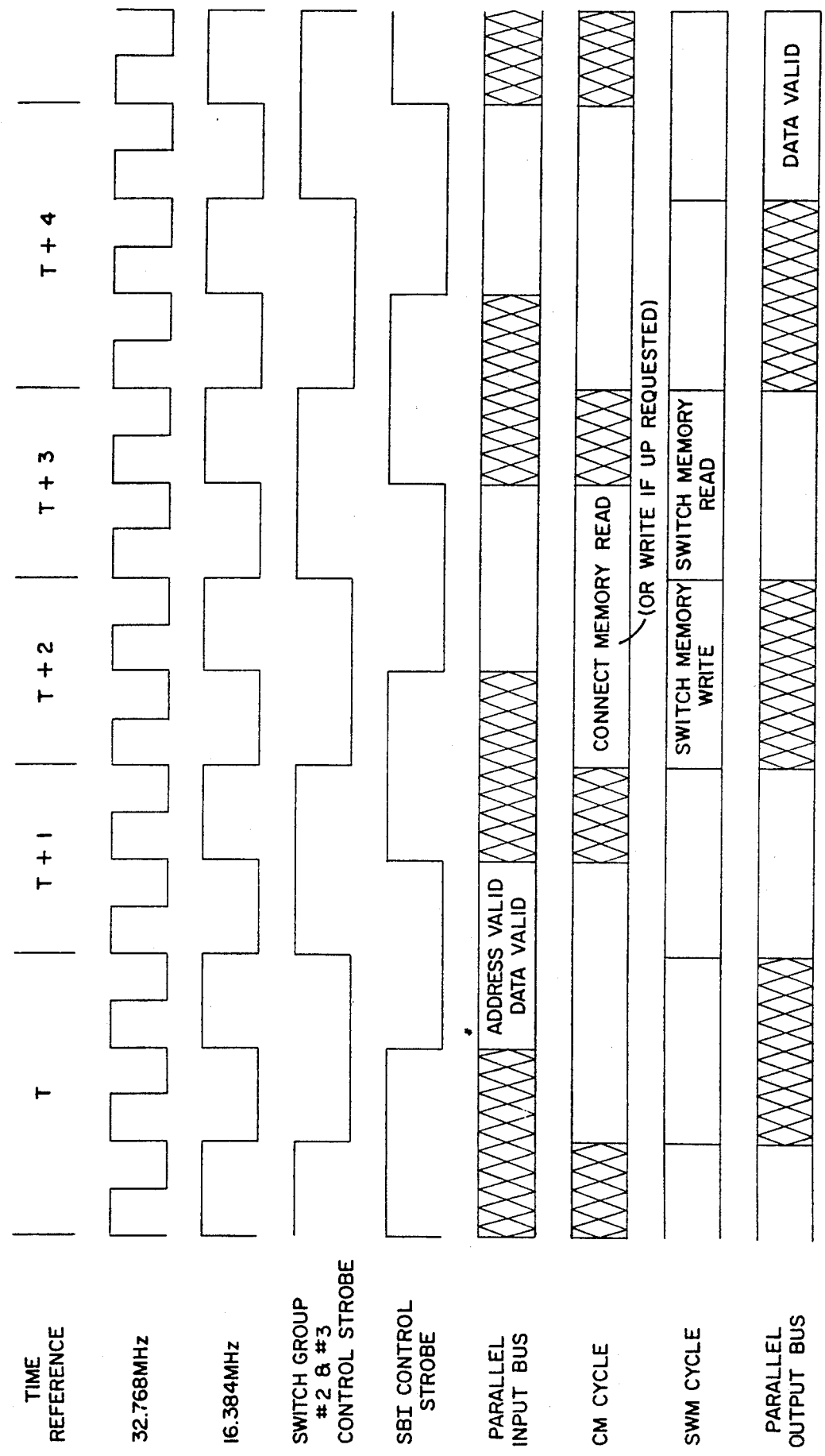
FIG. 7 is an overall timing diagram corresponding to the operation of the parallel time slot interchanger bank illustrated in FIGS. 3-6.

Referring now to FIG. 4 in combination with the timing diagram shown in FIG. 7, the following description of group bank #1 involves use of switch block$_{1,1}$, switch block$_{1,2}$ and switch block$_{1,3}$.

At the beginning of time interval "T", timing generator 34 sends a strobe (part of timing reference 80, see FIGS. 6A and 8) to the interconnected external devices attached to switch group #1 parallel input bus 28 and output parallel bus 30 as well as to all switch blocks 42 of each group bank. Based upon the strobe from timing generator 34, a 16 bit data word and a 10 bit switch memory channel address are gated onto switch group #1 parallel input bus 28 which comprises parallel data bus 29 and parallel address bus 38.

For the configuration shown in FIG. 6 using SBI links for switch group #1, this strobe, a 256 kilohertz SBI sync reference 41 from one of the control logic blocks 44 of group bank #1, a 16 bit data word and a 10 bit SBI channel switch memory address are gated onto the TSI parallel input bus 28 by one of the four SBI group of links.

At the end of time interval "T", the 10 bit address and the 16 bit data are respectively latched into latches 56 and 46 (see FIG. 6) of switch block$_{1,1}$, switch block$_{2,1}$ and switch block$_{3,1}$. The 10 bit address is also latched into latch 54 of switch block$_{1,1}$, switch block$_{1,2}$ and switch block$_{1,3}$, since only this address is needed with respect to performing a switch memory read operation for switch groups #1, #2 and #3 concerning group bank #1 parallel output bus 30. Only the connect memory having an ID field 63 matching its switch block's ID 50 causes the corresponding switch memory read data latch to be enabled. As explained above, this determination could alternatively be made by examining a flag bit of the connect memory address location to ascertain if valid switch memory address information is present.

During time interval "T+1", the control logic within each switch block determines if the latched address within latch 54 matches a possible pending connect memory access address (that is, if the corresponding connect memory address contains switch memory address information) from processor 32 (see FIGS. 2 and 6) via bus 33 or whether the valid/invalid flag status bit 116 indicates an available channel; that is, a channel for which incoming data is not present. If a match occurs or if the flag status indicates an available time slot, a processor connect memory operation occurs as set forth more fully below. Otherwise at the end of time interval "T+1", the latched address in latch 54 is available as the address for the connect memory read operation via the control connect memory address bus 35.

The switch block connect memory read operation takes place from time interval "T+2" through the first half of interval "T+3". The switch memory address information present on the connect memory output at the end of interval "T+2" is sent to switch memory 24 via bus 39. This information therefore initiates the start of a switch memory read operation. At the half-way point of interval "T 3", the connect memory address output is latched in the control logic block. The control logic block 44 also uses this address information to report back to processor 32 the results of a requested processor connect memory read cycle if one is pending.

Also during interval "T+2", the switch group #1 switch memory write address and data previously latched into switch block$_{1,1}$, switch block$_{2,1}$ and switch block$_{3,1}$ at the end of interval "T" are sent to the designated switch memory locations. Internal write pulses are used within the corresponding switch blocks (SMWE signal) to achieve this result.

At the beginning of interval "T+3", the control logic 44 of the enabled connect memory decodes the connect memory output read during interval "T+2". The actual switch memory data read from switch memory 24 for the enabled switch block is latched into latch 48 at the end of interval "T+3".

During interval "T+4", the control logic module 44 of the enabled switch block outputs on line 76 a signal to cause the data in latch 48 to be placed on parallel output bus 30.

The timing generator synchronizes all operations between the switch blocks and the external devices by providing a common 16.384 megahertz clock, a common 32.768 megahertz clock for the switch blocks only, and 8.192 megahertz strobes.

The complete time slot interchanger cycle thus takes five time intervals which equates to six TSI sub-channel periods, each having a length of 61 nanoseconds. Thus the complete TSI cycle is performed in approximately 366 nanoseconds.

Processor Connect Memory Operation

The connect memory in each switch block can be read from or written to under control of the control logic block 44. If a read/write operation is pending, access to the connect memory is granted if:

(1) the processor read/write address for the connect memory matches the current 10 bit switch memory read address for the same group bank, or
(2) the most significant bit (MSB) 116 (see FIG. 8) of an 11 bit switch memory write address identifies an unused (i.e. invalid) channel period. Such a bit is actually a flag provided by the external devices to indicate that the parallel bus time slot is unused.

When the processor operation is completed based on a matching of addresses, the operation occurs transparently with the normal ongoing switch memory read operations.

Interface bus 33 provides access to the switch block connect memory by processor 32. For processor read or write operations, the connect memory address and data are shifted into and held until an unused channel time slot is detected or an equivalent address is available. The time interval sequence is presented below.

Referring to FIG. 7 at the beginning of time interval "T", the timing generator sends a control strobe to the switch group element based upon a 16.384 megahertz clock. The control strobe initiates the transfer of a 10 bit switch memory address and a data flag (for parallel interfaces) onto address bus 38. The data flag indicates when a channel time slot is unused. At the end of time interval "T", the 10 bits of address and the flag bit, if present, are latched into switch block 42 (latch 56 and latch 54).

At the start of time interval "T+1", a determination is made by the switch block control logic 44 based upon the state of the address flag bit, such that if the address flag bit identifies an unused channel, the 10 bit channel address which was previously shifted into the switch block is used as the connect memory address. Such switching of the address to the connect memory occurs during time interval "T+1".

If the address flag bit does not indicate an unused time slot, a comparison of the read channel address to the processor address is made during the same time interval, "T+1". If an equivalence is found, the channel address is gated to the connect memory address inputs at the end of time interval "T+1". In the subsequent time intervals, the control logic shifts out onto the interface bus 33 the resulting connect memory read data for the desired connect memory location and also uses it for ongoing switch memory operations as discussed above. If the processor is writing data to a desired connect memory location, a 15 bit data word from the interface bus 33 is also gated to the connect memory data inputs at the end of time interval "T+1". This data replaces the data in that particular connect memory address. This updated information is also used to perform the read operation for switch memory 24 of that switch block.

During time interval "T+2" and the first half of time interval "T+3", if a connect memory write operation is pending, the timing generator internally generates a connect memory write enable (CMWE) strobe at the time interval "T+2". This strobe allows all set up requirements in the first half of time interval "T +2" to be accomplished. Data gated by the control logic is written into the connect memory and is immediately applied to the switch memory address at the beginning of time interval "T+3" even though it is not latched internally in the control logic block connect memory output latch until the half-way point of time interval "T+3". Through use of this procedure, the switch memory data read operation, if programmed to be enabled by the particular connect memory output, is able to begin its operation at the beginning of time interval "T+3".

If a processor connect memory read operation is to take place, the normal connect memory read operation occurs from time interval "T+2" to the half-way point of time slot "T+3". The address latched (latch 54) into the switch block at the end of channel interval "T" is used as the connect memory address. The connect memory output is also immediately gated to the switch memory for the ongoing normal switch memory read operation starting at time interval "T+3". At the half-way point of time interval "T+3", the data read from the connect memory is latched in the control logic block for transmission back to processor 32 and for the corresponding switch memory.

In order for subsequent connect memory operations to occur, the time slot interchanger completes the connect memory cycle by responding to the processor with a six word serial bus protocol frame. The relevant information contained in this frame indicates that the initial message was received without a checksum error. It also contains the 15 bit data word read from the connect memory for read operations, and a new checksum. Upon serial transmission of the checksum, the time slot interchanger is ready to accept another connect memory read/write request from the interconnected processor 32.

With each switch block containing its own connect memory and only one switch block per group bank allowed to output the data read from its switch memory during any given channel time slot, a technique has been developed to minimize the number of connect memory write operations required in order to initialize one channel connection. This function is accomplished by a connect memory group bank write operation. This function uses the hardwired ID 50 of each switch block (see FIG. 6). During connect memory write operations, all switch blocks in a group bank are written to at the same time. The same data word is written to all connect memories, but it contains the unique hardwire address of only one of the switch blocks in the group bank. During switch memory read operations, all the switch block connect memories are read, but only the switch block with the correct hardwire address in field 63 (see FIG. IB) is allowed to output its switch memory address data received via bus 37 onto switch memory address bus 39, and thus only that particular switch memory within the group bank has its data latch 48 enabled for presentation of switch memory data onto parallel data output bus 30.

Similarly during connect memory read operations via interconnected processor 32, only the switch block with the corresponding hardwired ID is allowed to return data back to the processor over the interface bus 33. Thus the set-up times associated with large parallel time slot interchanger matrixes such as a 9×9 TSI matrix is minimized.

Thus what has been described is a parallel time slot interchanger having a matrix architecture in which the constituent elements of the matrix comprise switch blocks and wherein each switch block contains distributed connect memory that contains switch memory address data. Each switch block also contains a unique identification so that only one switch memory of a group bank outputs data during any given channel time slot. This unique switch block identification is also used to update connect memory data (switch memory address data) by an interconnected processor. The resulting parallel TSI is flexible in its configuration and is particularly adapted for large-scale integration fabrication.

It will thus be seen that the objects set forth above and those made apparent from the preceding description are efficiently attained and since certain changes may be made in the parallel time slot interchanger matrix construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described the invention, what is claimed is:

1. A parallel time slot interchanger for the exchange of data between up to N times P channels, where N and P are both integers equal to or greater than oe and N times P is an integer greater than one, where data and address information, if present, regarding each channel j of every switch group i, where j is an integer whic increments from zero to $P-1$ and i is any integer in a groupof integers ranging fromone to N, is synchronously repetitively transferred to a corresponding parallel switch group input bus i during time slot j; nad wherein data representing any channel j previously placed on any switch groupinput bus i can be placed on a parallel switch group output bus k, where k is an integer from one to N, during time slot j, whereinthe parallel time slot interchanger comprises up to $N^2$ switch blocks, arranged in N grup banks, eachh group bank i corresponding to a switch group i, with up to N switch blocks coirresponding to any switch groupi so that anyswitch block is identifiable as switchblock$_{i,m}$, where m is an integer from1 to N, wherein each switch block $_{i,m}$ comprises:
  (1) means for uniquely identifying the switch block from all other switch blocks in group bank i;
  (2) an addressable switch memory, the switch memory comrising at least P addressable memory locations for the storage of channel data information from switch group m;
  (3) means, interconnected to the parallel switch group input bus m, for writing data from channel j of switchgroup m based upon the address information regarding channel j, into a corresponding address of the switch memory;
  (4) an addressable connect memory for the storage of switch memory address information for the switch memory ofhtesame switch block, the connect memory comprising at lesat P addressable memory locations for the storage of this switch memory address information;

(5) means for reading data from an addressable location of the connect memory based upon the address information of channel j of switch group i;

(6) means, interconnected to the parallel switch group output bus i, for reading the switch memory data stored at the address location of the switch memory defined by the switch memory address information read from the connect memory; and (7) means for placing the read switch memory data on the parallel switch group output bus i if a portion of the read connect memory data favorably compares to the switch block identifying means.

2. A parallel time slot interchanger as defeind in claim 1, wherein if interconnections between all channels of switch group i are not desired with respect to all channels of switch group q, where q is any integer in the group of integers ranging from one to N and wherein q may equal i, then switch block$_{q,i}$ can be eliminated from switch group q.

3. A parallel time slot interchanger as defined in claim 2, wherein each connect memory addressable memory location contains a switch block identification field for the storage of switch block identification data, and wherein the means for uniquely identifying the switch block includes a hardwired address and wherein the comparison means includes means for comparing the hardwired address with the switch block identifying information stored in the switch identification field, and if a concurrence occurs, enabling the switch memory output of the corresponding switch block.

4. A parallel time slot interchanger as defined in claim 3, wherein P is equal to 1,024.

5. A parallel time slot interchanger as defined in claim 3, wherein not every channel j of switch group i need be present during corresponding time slot j.

6. A parallel time slot interchanger as defined in claim 5, further comprising a processor for writing switch memory address information to any connect memory, and further comprising means, interacting with the switch block identifying means, for interconnecting said processor to any particular connect memory, said interconnecting means comprising means for comparing the address information regarding channel j of switch group i with the address of the particular connect memory that the processor wishes to write data, and if a concurrence occurs, then the processor writing data to the selected connect memory at the selected address during the neighborhood of time when that address of the connect memory is being addressed by the switch block means for reading data from an addressable location of the connect memory based upon the address information of channel j of switch group i.

7. A parallel time slot interchanger as defined in claim 6, wherein the means for interconnecting the processor to any particular connect memory address location occurs during any time slot j when no data for channel j of group bus i is present.

8. A parallel time slot interchanger as defined in claim 7, wherein the address information regarding each channel j of every switch group i of which at least one channel j does not have data to be stored, comprises an address flag and wherein the processor interconnecting means includes means so that if this address flag is enabled indicating that no data is present for channel j, then the processor is interconnected to the desired connect memory address location for purposes of writing data thereto.

9. A parallel time slot interchanger as defined in claim 2, wherein at last one switch group r, where r is any integer in a group of integers ranging from one to N, further comprises a first trial bus interface for converting incoming serial channel data information into parallel data with identifying address information and further comprises a second serial bus interface connected to the parallel switch group output bus r for converting the parallel output information read from the switch memory into serial information.

10. A parallel time slot interchanger as defined in claim 2, wherein each switch block is fabricated from application specific integrated circuits.

11. A parallel time slot interchanger as defined in claim 1, further comprising a processor for writing and reading switch memory address information to any connect memory, and further comprising means, interacting with the switch block identifying means, for interconnecting means comprising means for comparing the address information regarding channel j of switch group i with the address of the particular connect memory that the processor wishes to read or write data therefrom, and if a concurrence occurs, then the processor reading or writing date to the selected connect memory at the selected address during the neighborhood of time when that address of the connect memory is being addressed by the switch block means for reading data from an addressable location of the connect memory based upon the address information of channel j of switch group i.

12. A parallel time sort interchanger as defined in claim 1, wherein the means for uniquely identifying the switch block includes a hardwired address and wherein the comparison means includes means for comparing the hardwired address with the switch block identifying information stored in the switch identification field, and if a concurrence occurs, enabling the switch memory output of the corresponding switch block.

13. A parallel time slot interchanger as defined in claim 12, wherein P is equal to 1,024.

14. A parallel time slot interchanger as defined in claim 13, wherein not every channel j of switch group i need be present during corresponding time slot j.

15. A parallel time slot interchanger as defined in claim 14, further comprising a processor for writing switch memory address information to any connect memory, and further comprising means, interacting with the switch block identifying means, for interconnecting said processor to any particular connect memory, said interconnecting means comprising means for comparing the address information regarding channel j of switch group i with the address of the particular connect memory that the processor wishes to write data, and if a concurrence occurs, then the processor writing data to the selected connect memory at the selected address during the neighborhood of time when that address of the connect memory is being addressed by the switch block means for reading data from an addressable location of the connect memory based upon the address information of channel j of switch group i.

16. A parallel time slot interchanger as defined in claim 15, wherein the means for interconnecting the processor to any particular connect memory address location occurs during any time slot j when no data for channel j of group bus i is present.

17. A parallel time slot interchanger as defined in claim 16, wherein the address information regarding each channel j of every switch group i of which at last one channel j does not have data to be stored, comprises an address flag and wherein the processor interconnecting means includes means so that if this address flag is enabled indicating that no data is present for channel j, then the processor is interconnected to the desired connect memory address location for purposes of writing data thereto.

18. A switch block for use in the construction of a parallel time slot interchanger for the exchange of data between a plurality of channels, the parallel time slot interchanger of the type wherein the channels are arranged in switch groups, each switch group containing a second plurality of channels, wherein the exchange of data from channel j of switch group b to channel k of switch group a, where a, b, j and k are each integers which are not necessarily unique, is performed in combination with a unique switch block$_{a,b}$, each said switch block comprising:
(1) means for identifying the switch block;
(2) an addressable switch memory, the switch memory comprising addressable memory locations for the storage of channel data information from switch group b;
(3) means for writing data from channel j of switch group b into an addressable memory location of the switch memory;
(4) an addressable connect memory for the storage of switch memory address information for the switch memory of the same switch block, the connect memory comprising addressable memory locations for the storage of this switch memory address information;
(5) means for reading data from an addressable location of the connect memory based upon the address information of channel j of switch group b;
(6) means for reading the switch memory data stored at the addressable memory location of the switch memory defined by the switch memory address information read from the connect memory; and
(7) means for placing the read switch memory data on the parallel switch group output bus i if a portion of the read connect memory data favorably compares to the switch block identifying means.

19. A switch block as defined in claim 18, wherein each connect memory addressable memory location contains a switch block identification field for the storage of switch block identification data, and wherein the means for uniquely identifying the switch block includes a hardwired address and wherein the comparison means includes means for comparing the hardwired address with the switch block identifying information stored in the switch identification field, and if a concurrence occurs, enabling the switch memory output of the corresponding switch block.

20. A parallel time slot interchanger as defined in claim 1, wherein each connect memory addressable memory location contains a switch block identification field for the storage of switch block identification data, and wherein the comparison means includes means for comparing the metals for uniquely identifying the switch block with the switch block identifying information stored in the switch identification field, and if a occurrence occurs, enabling the switch memory output of the corresponding switch block.

21. A parallel time slot interchanger as defined in claim 1, wherein P is equal to 1,024.

22. A parallel time slot interchanger as defined in claim 1, wherein not every channel j of switch group i need be present during corresponding time slot j.

23. A parallel time slot interchanger for the exchange of data between up to N times P channels, where N and P are both integers equal to or greater than one and N times P is an integer greater than one, where data, if present, regarding each channel j of every switch group i, where j is an integer which increments from zero to $P-1$ and i is any integer in a group of integers ranging from one to N, is transferred to a corresponding parallel switch group input bus i during time slot j; and wherein data representing any channel j previously placed on any switch group input bus i can be placed on a parallel switch group output bus k, where k is an integer from one to N, during time slot j, wherein the parallel time slot interchanger comprises up to $N^2$ switch blocks, arranged in N group banks, each group bank i corresponding to a switch group i, with up to N switch blocks corresponding to any switch group i so that any switch block is identifiable as switch block$_{i,m}$, where m is an integer from 1 to N, wherein each switch block$_{i,m}$ comprises:
(1) means for uniquely identifying the switch block from all other switch blocks in group bank i;
(2) an addressable switch memory, the switch memory comprising at least P addressable memory locations for the storage of channel data information from switch group m;
(3) means, interconnected to the parallel switch group input bus m, for writing data from channel j of switch group m into a switch memory addressable memory location;
(4) an addressable connect memory for the storage of switch memory address information for the switch memory of the same switch block and for the storage of switch block identifying information, the connect memory comprising addressable memory locations for the storage of this switch memory address information;
(5) means for storing switch memory address information and switch block identifying information in at least some of the addressable memory locations of the connect memory;
(6) means for reading data from any addressable location of the connect memory; and
(7) means, interconnected to the parallel switch group output bus i, for reading and placing the switch memory data stored at the address location of the switch memory defined by the switch memory address information read from the connect memory on the parallel switch group output bus i if a portion of the read connect memory data favorably compares to the switch block identifying means.

24. A parallel time slot interchanger as defined in claim 23, wherein if interconnections between all channels of switch group i are not desired with respect to all channels of switch group q, where q is any integer in the group of integers ranging from one to N and wherein q may equal i, then switch block$_{q,i}$ can be eliminated from switch group q.

25. A parallel time slot interchanger as defined in claim 24, wherein each connect memory addressable memory location contains a switch block identification field for the storage of switch block identification data, and wherein the comparison means includes means for comparing the means for uniquely identifying the switch block with the switch block identifying information stored in the switch identification field, and if a concurrence occurs, enabling the switch memory output of the corresponding switch block.

26. A parallel time slot interchanger as defined in claim 25, wherein P is equal to 1,024.

27. A parallel time slot interchanger as defined in claim 25, wherein not every channel j of switch group i need be present during corresponding time slot j.

28. A parallel time slot interchanger as defined in claim 27, wherein address information, if present, in addition to data information, regarding each channel j of switch group i, is transferred to a corresponding parallel switch group input bus i during time slot j, and wherein the parallel time slot interchanger further comprises a processor for writing switch memory address information to any connect memory, and means, interacting with the switch block identifying means, for interconnecting said processor to any particular connect memory, said interconnecting means comprising means for comparing the address information regarding channel j of switch group i with the address of the particular connect memory than the processor wishes to write data, and if a concurrence occurs, then the processor writing data to the selected connect memory a the selected address during the neighborhood of time when that address of the connect memory is being addressed by the switch block for reading data from an addressable location of the connect memory based upon the address information of channel j of switch group i.

29. A parallel time slot interchanger as defined in claim 28, wherein the means for the interconnecting the processor to any particular connect memory address location occurs during any time slot j when no data for channel j of group bus i is present.

30. A parallel time slot interchanger as defined in claim 29, wherein the address information regarding each channel j of every switch group i of which at least one channel j does not have data to be stored, comprises an address flag and wherein the processor interconnecting means includes means so that if this address flag is enabled indicating that no data is present for channel j, then the processor is interconnected to the desired connect memory address location for purposes of writing data thereto.

31. A parallel time slot interchanger as defined in claim 23, wherein each connect memory addressable memory location contains a switch block identification data, and wherein the comparison means includes means for comparing the means for uniquely identifying the switch block with the switch block identifying information stored in the switch identification field, and if a concurrence occurs, enabling the switch memory output of the corresponding switch block.

32. A parallel time slot interchanger as defined in claim 23, wherein not every channel j of switch group i need be present during corresponding time slot j.

33. A parallel time slot interchanger as defined in claim 23, wherein address information, if present, in addition to data information, regarding each channel j of switch group i, is transferred to a corresponding parallel switch group input bus i during the time slot j, and wherein the parallel time slot interchanger further comprises a processor for writing switch memory address information to any connect memory, and means, interacting with the switch block identifying means, for interconnecting said processor to any particular connect memory, said interconnecting means comprising means for comparing the address information regarding channel j of switch group i with the address of the particular connect memory that the processor wishes to write data, and if a concurrence occurs, then the processor writing data to the selected connect memory at the selected address during the neighborhood of time when that address of the connect memory is being addressed by the switch block for reading data from an addressable location of the connect memory based upon the address information of channel j of switch group i.

34. A parallel time slot interchanger as defined in claim 33, wherein the means for interconnecting the processor to any particular connect memory address location occurs during any time slot j when no data for channel j of group bus i is present.

35. A parallel time slot interchanger as defined in claim 34, wherein the address information regarding each channel j of every switch group i of which at least one channel j does not have data to be stored, comprises an address flag and wherein the processor interconnecting means includes means so that if this address flag is enabled indicating that no data is present for channel j, then the processor is interconnected to the desired connect memory address location for purposes of writing data thereto.

36. A parallel time slot interchanger for the exchange of data between up to N times P channels, where N and P are both integers equal to or greater than one and N times P is an integer greater than one, where data, if present, regarding each channel j of every switch group i, where j is an integer which increments from zero to $P-1$ and i is any integer in a group of integers ranging from one to N, is transferred to a corresponding parallel switch group input bus i during time slot j; and wherein data representing any channel j previously placed on any switch group input bus i can be placed on a parallel switch group output bus k, where k is an integer from one to N, during time slot j, wherein the parallel time slot interchanger comprises up to $N^2$ switch blocks, arranged in N group banks, each group bank i corresponding to a switch group i, with up to N switch blocks corresponding to any switch group i so that any switch block is identifiable as switch block$_{i,m}$, where m is an integer from 1 to N, wherein each switch block$_{i,m}$ comprise:

(1) means for uniquely identifying the switch block from all other switch blocks in group bank i;

(2) an addressable switch memory, the switch memory comprising at least P addressable memory locations for the storage of channel data information from switch group m;

(3) means, interconnected to the parallel switch group input bus m, for writing data from channel j of switch group m into a switch memory addressable memory location;

(4) an addressable connect memory for the storage of switch memory address information for the switch memory of the same switch block, the connect memory comprising at least P addressable memory locations for the storage of this switch memory address information;

(5) means for reading data from any addressable location of the connect memory;

(6) means, interconnected to the parallel switch group output bus i, for reading the switch memory data stored at the address location of the switch memory defined by the switch memory address information read from the connect memory; and (7) means for placing the rad switch memory data on the parallel switch group output bus i if a portion of the read connect memory data favorably compares to the switch block identifying means; and wherein at least one switch group r, where r is any integer in a group of integers ranging from one to N, further comprises a first serial bus interface for converting incoming serial channel data information into parallel data with identifying address information and further comprises a second serial bus interface connected to the parallel switch group output bus r for converting the parallel output information read from the switch memory into serial information.

37. A parallel time slot interchanger as defined in claim 36, wherein if interconnections between all channels of switch group i are not desired with respect to all channels of switch group q, where q is any integer in the group of integers ranging from one to N and wherein q may equal i, then switch block$_{q,i}$ can be eliminated from switch group q.

38. A parallel time slot interchanger as defined in claim 36, wherein each connect memory addressable memory location contains a switch block identification field for the storage of switch block identification data, and wherein the comparison means includes means for comparing the means for uniquely identifying the switch block with the switch block identifying information stored in the switch identification field, and if a concurrence occurs, enabling the switch memory output of the corresponding switch block.

39. A parallel time slot interchanger as defined in claim 36, wherein not every channel j of switch group i need be present during corresponding time slot j.

40. A parallel time slot interchanger as defined in claim 36, wherein address information, if present, in addition to data information, regarding each channel j of switch group i, is transferred to a corresponding parallel switch group input bus i during time slot j, and wherein the parallel time slot interchanger further comprises a processor for writing switch memory address information to any connect memory, and means, interacting with the switch block identifying means, for interconnecting said processor to any particular connect memory, said interconnecting means comprising means for comparing the address information regarding channel j of switch group i with the address of the particular connect memory that the processor wishes to write data, and if a concurrence occurs, then the processor writing data to the selected connect memory at the selected address during the neighborhood of time when that address of the connect memory is being addressed by the switch block for reading data from an addressable location of the connect memory based upon the address information of channel j of switch group i.

41. A parallel time slot interchanger as defined in claim 40, wherein the means for interconnecting the processor to any particular connect memory address location occurs during any time slot j when on data for channel j of group bus i is present.

42. A parallel time slot interchanger as defined in claim 41, wherein the address information regarding each channel j of every switch group i of which at least one channel j does not have data to be stored, comprises an address flag and wherein the processor interconnecting means includes means so that if this address flag is enabled indicating that no data is present for channel j, then the processor is interconnected to the desired connect memory address location for purposes of writing data thereto.

43. A parallel time slot interchanger as defined in claim 40, wherein the means for uniquely identifying the switch block include a hardwired address and wherein the means for placing the read switch memory data on the parallel switch group output bus i includes means for comparing the hardwired address with the switch block identifying information stored in the switch identification field, and if a concurrence occurs, enabling the switch memory output of the corresponding switch block.

44. A switch block for use in the construction of a parallel time slot interchanger for the exchange of data between a plurality of channels, the parallel time slot interchanger of the type wherein the channels are arranged in switch groups, each switch group containing a second plurality of channels, wherein the exchange of data from channel j of switch group b to channel k of switch group a, where a, b, j and k are each integers which are not necessarily unique, is performed in combination with a unique switch block$_{a,b}$, each said switch block comprising:

(1) means for identifying the switch block;
(2) an addressable switch memory, the switch memory comprising addressable memory locations for the storage of channel data information from switch group b;
(3) means for writing data from channel j of switch group b into an addressable memory location of the switch memory;
(4) an addressable connect memory for the storage of switch memory address information for the switch memory of the same switch block, the connect memory comprising addressable memory locations for the storage of this switch memory address information;
(5) means for reading data from an addressable location of the connect memory; and
(6) means for reading and placing the switch memory data stored at the addressable memory location of the switch memory defined by the switch memory address information read from the connect memory on the parallel switch group output bus i if a portion of the read connect memory data favorably compares to the switch block identifying means.

45. A parallel time slot interchanger as defined in claim 44, wherein each connect memory addressable memory location contains a switch block identification field for the storage of switch block identification data, and wherein the comparison means includes means for comparing the means for uniquely identifying the switch block with the switch block identifying information stored in the switch identification field, and if a concurrence occurs, enabling the switch memory output of the corresponding switch block.

46. A parallel time slot interchanger as defined in claim 1, further comprising:

(8) means for storing switch memory address information and switch block identifying information in at least some of the addressable memory locations of the connect memory.

47. A parallel time slot interchanger as defined in claim 46, wherein if interconnections between all channels of switch group i are not desired with respect to all channels of switch group q, where q is any integer in the group of integers ranging from one to N and wherein q may equal i, then switch block$_{q,i}$ can be eliminated from switch group q.

48. A parallel time slot interchanger as defined in claim 47, wherein each connect memory addressable memory location contains a switch block identification field for the storage of switch block identification data, and wherein the comparison means includes means for comparing the means for uniquely identifying the switch block with the switch block identifying information stored in the switch identification field, and if a concurrence occurs, enabling the switch memory output of the corresponding switch block.

49. A parallel time slot interchanger as defined in claim 48, wherein not every channel j of switch group i need be present during corresponding time slot j.

50. A parallel time slot interchanger as defined in claim 46, further comprising a processor for writing switch memory address information to any connect memory, and further comprising means, interacting with the switch block identifying means, for interconnecting said processor to any particular connect memory, said interconnecting means comprising means for comparing the address information regarding channel j of switch group i with the address of the particular connect memory that the processor wishes to write data, and if a concurrence occurs, then the processor writing data to the selected connect memory at the selected address during the neighborhood of time when that address of the connect memory is being addressed by the switch block means for reading data from an addressable location of the connect memory based upon the address information of channel j of switch group i.

51. A parallel time slot interchanger as defined in claim 50, wherein the means for interconnecting the processor to any particular connect memory address location occurs during any time slot j when no data for channel j of group bus i is present.

52. A parallel time slot interchanger as defined in claim 51, wherein the address information regarding each channel j of every switch group i of which at least one channel j does not have data to be stored, comprises an address flag and wherein the processor interconnecting means includes means so that if this address flag is enabled indicating that no data is present for channel j, then the processor is interconnected to the desired connect memory address location for purposes of writing data thereto.

53. A method of exchanging data between up to N times P channels, where N and P are both integers equal to or greater than one and N times P is an integer greater than one, where data, if present, regarding each channel j of every switch group i, where j is an integer which increments from zero to P−1 and i is any integer in a group of integers ranging from one to N, is transferred to a corresponding parallel switch group input bus i during time slot j; and wherein data representing any channel j previously placed on any switch group input bus i can be placed on a parallel switch group output bus k, where k is an integer from one to N, during time slot j, wherein the method of exchanging data uses up to $N^2$ switch blocks, arranged in N group banks, each group bank i corresponding to a switch group i, with up to N switch blocks corresponding to any switch group i so that any switch block is identifiable as switch block$_{i,m}$, where m is an integer from 1 to N, wherein each switch block has an addressable switch memory for the storage of channel data information from switch group m and a connect memory for the storage of switch memory address information for the switch memory of the same switch block and for the storage of switch block identifying information, the connect memory comprising addressable memory locations for the storage of this switch memory address information, the method of exchanging data comprising the following steps for each switch block$_{i,m}$:

(1) uniquely identifying the switch block from all other switch blocks in group bank i;
(2) writing data from channel j of switch group m into a switch memory addressable memory location;
(3) storing switch memory address information and switch block identifying information inn at least some addressable memory locations of the connect memory;
(4) reading data from any addressable location of the connect memory; and
(5) reading and placing the switch memory data stored at the address location of the switch memory defined by the switch memory address information read from the connect memory on the parallel switch group output bus i if a portion of the read connect memory data favorably compares to the identified switch block.

54. A method of exchanging data as defined in claim 53, wherein each connect memory addressable memory location contains a switch block identification field for the storage of switch block identification data, and wherein the step of uniquely identifying the switch block includes a hardwired address and wherein the step of reading and placing the switch memory data on the output bus i includes the step of comparing the hardwired address with the switch block identifying information stored in the switch identification field, and if a concurrence occurs, enabling the switch memory output of the corresponding switch block.

* * * * *

UNITED STATES PATENT AND TRADEMARK OFFICE
CERTIFICATE OF CORRECTION

PATENT NO. : 5,014,268

DATED : May 7, 1991

INVENTOR(S) : Tyrrell et al

It is certified that error appears in the above-identified patent and that said Letters Patent is hereby corrected as shown below:

At column 20, please delete lines 31-68 inclusive and substitute therefor:

--1. A parallel time slot interchanger for the exchange of data between up to N times P channels, where N and P are both integers equal to or greater than one and N times P is an integer greater than one, where data and address information, if present, regarding each channel j of every switch group i, where j is an integer which increments from zero to P-1 and i is any integer in a group of integers ranging from one to N, is synchronously repetitively transferred to a corresponding parallel switch group input bus i during time slot j; and wherein data representing any channel j previously placed on any switch group input bus i can be placed on a parallel switch group output bus k, where k is an integer from one to N, during time slot j, wherein the parallel time slot interchanger comprises up to $N^2$ switch blocks, arranged in N group banks, each group bank i corresponding to a switch group i, with up to N switch blocks corresponding to any switch group i so that any switch block is identifiable as switch block$_{i,m}$, where m is an integer from 1 to N, wherein each switch block$_{i,m}$ comprises:

(1) means for uniquely identifying the switch block from all other switch blocks in group bank i;

(2) an addressable switch memory, the switch memory comprising at least P addressable memory locations for the storage of channel data information from switch group m;

UNITED STATES PATENT AND TRADEMARK OFFICE
CERTIFICATE OF CORRECTION

| | | |
|---|---|---|
| PATENT NO. : | 5,014,268 | Page 2 of 3 |
| DATED : | May 7, 1991 | |
| INVENTOR(S) : | Tyrrell et al | |

It is certified that error appears in the above-identified patent and that said Letters Patent is hereby corrected as shown below:

(3) means, interconnected to the parallel switch group input bus m, for writing data from channel j of switch group m based upon the address information regarding channel j, into a corresponding address of the switch memory;
    (4) an addressable connect memory for the storage of switch memory address information for the switch memory of the same switch block, the connect memory comprising at least P addressable memory locations for the storage of this switch memory address information;--.

At column 21, line 13, please change "defeind" to --defined--.

At column 22, line 4, please change "trial" to --serial--;
    at line 19, after "interconnecting", please insert --said processor to any particular connect memory, said interconnecting--;
    at line 24, please change "date" to --data--; and
    at line 31. please change "sort" to --slot--.

At column 23, line 62, please change "metals" to --means".

UNITED STATES PATENT AND TRADEMARK OFFICE
CERTIFICATE OF CORRECTION

PATENT NO. : 5,014,268

DATED : May 7, 1991

INVENTOR(S) : Tyrrell et al

It is certified that error appears in the above-identified patent and that said Letters Patent is hereby corrected as shown below:

At column 25, line 49, prior to "data", please insert --field for storage of switch block identification--.

At column 27, line 1, please change "rad" to --read--.

At column 28, line 5, please change "include" to --includes--.

At column 30, line 6, please change "toN" to --to N--; and at line 29, please change "inn" to --in--.

Signed and Sealed this

Twenty-seventh Day of April, 1993

Attest:

MICHAEL K. KIRK

*Attesting Officer*     Acting Commissioner of Patents and Trademarks